US012603848B2

(12) United States Patent
Zohar et al.

(10) Patent No.: US 12,603,848 B2
(45) Date of Patent: Apr. 14, 2026

(54) EFFICIENT MECHANISM FOR THE TRANSMISSION OF MULTIPATH DUPLICATE PACKETS

(71) Applicant: VMware LLC, Palo Alto, CA (US)

(72) Inventors: Eyal Zohar, Shimshit (IL); Alex Markuze, Rosh HaAyin (IL); Igor Golikov, Kfar Saba (IL); Israel Cidon, San Francisco, CA (US)

(73) Assignee: VMware LLC, Palo Alto, CA (US)

( * ) Notice: Subject to any disclaimer, the term of this patent is extended or adjusted under 35 U.S.C. 154(b) by 508 days.

(21) Appl. No.: 18/088,555

(22) Filed: Dec. 24, 2022

(65) Prior Publication Data

US 2023/0216804 A1     Jul. 6, 2023

Related U.S. Application Data

(60) Provisional application No. 63/296,471, filed on Jan. 4, 2022.

(51) Int. Cl.
  H04L 47/34      (2022.01)
  H04L 45/00      (2022.01)
      (Continued)
(52) U.S. Cl.
  CPC ............ H04L 47/34 (2013.01); H04L 45/121 (2013.01); H04L 45/42 (2013.01); H04L 45/566 (2013.01)
(58) Field of Classification Search
  CPC ....... H04L 47/34; H04L 45/121; H04L 45/42; H04L 45/566; H04L 45/24
  See application file for complete search history.

(56) References Cited

U.S. PATENT DOCUMENTS 5,652,751 A     7/1997   Sharony
5,909,553 A     6/1999   Campbell et al.
        (Continued)

FOREIGN PATENT DOCUMENTS

CN      1483270 A     3/2004
CN      1926809 A     3/2007
        (Continued)

OTHER PUBLICATIONS

Funabiki, Nobuo, et al., "A Frame Aggregation Extension of Routing Algorithm for Wireless Mesh Networks," 2014 Second International Symposium on Computing and Networking, Dec. 10-12, 2014, 5 pages, IEEE, Shizuoka, Japan.
        (Continued)

*Primary Examiner* — Shean Tokuta
(74) *Attorney, Agent, or Firm* — Quarles & Brady LLP

(57)        ABSTRACT

The method, in some embodiments, aggregates duplicate transmission control protocol (TCP) packets of a data stream duplicated and sent over disjoint routing paths. Each duplicate pair of packets includes a packet sequence number unique to that duplicate pair. The method iteratively (1) generates a window of packet sequence numbers for the data stream starting with a lowest packet sequence number, of the data stream, that has not been received, (2) receives a TCP packet sent over one of a first routing path and a second, disjoint routing path. If the packet sequence number of the received TCP packet is outside the window or is a duplicate of a previously received TCP packet, the method drops the received TCP packet. If the packet sequence number of the received TCP packet is within the window and is not a duplicate of a previously received TCP packet, the method stores the received packet.

20 Claims, 10 Drawing Sheets

(51) Int. Cl.
    *H04L 45/121*  (2022.01)
    *H04L 45/42*  (2022.01)

(56)                References Cited

U.S. PATENT DOCUMENTS

| | | | |
|---|---|---|---|
| 6,154,465 | A | 11/2000 | Pickett |
| 6,157,648 | A | 12/2000 | Voit et al. |
| 6,201,810 | B1 | 3/2001 | Masuda et al. |
| 6,363,378 | B1 | 3/2002 | Conklin et al. |
| 6,445,682 | B1 | 9/2002 | Weitz |
| 6,744,775 | B1 | 6/2004 | Beshai et al. |
| 6,976,087 | B1 | 12/2005 | Westfall et al. |
| 7,003,481 | B2 | 2/2006 | Banka et al. |
| 7,280,476 | B2 | 10/2007 | Anderson |
| 7,313,629 | B1 | 12/2007 | Nucci et al. |
| 7,320,017 | B1 | 1/2008 | Kurapati et al. |
| 7,373,660 | B1 | 5/2008 | Guichard et al. |
| 7,406,087 | B1 * | 7/2008 | Quach ..................... H04L 47/22 370/392 |
| 7,581,022 | B1 | 8/2009 | Griffin et al. |
| 7,680,925 | B2 | 3/2010 | Sathyanarayana et al. |
| 7,681,236 | B2 | 3/2010 | Tamura et al. |
| 7,751,409 | B1 | 7/2010 | Carolan |
| 7,844,212 | B1 * | 11/2010 | Woo ....................... H04H 60/11 455/445 |
| 7,962,458 | B2 | 6/2011 | Holenstein et al. |
| 8,051,185 | B2 | 11/2011 | Lee et al. |
| 8,094,575 | B1 | 1/2012 | Vadlakonda et al. |
| 8,094,659 | B1 | 1/2012 | Arad |
| 8,111,692 | B2 | 2/2012 | Ray |
| 8,141,156 | B1 | 3/2012 | Mao et al. |
| 8,224,971 | B1 | 7/2012 | Miller et al. |
| 8,228,928 | B2 | 7/2012 | Parandekar et al. |
| 8,243,589 | B1 | 8/2012 | Trost et al. |
| 8,259,566 | B2 | 9/2012 | Chen et al. |
| 8,274,891 | B2 | 9/2012 | Averi et al. |
| 8,301,749 | B1 | 10/2012 | Finklestein et al. |
| 8,385,227 | B1 | 2/2013 | Downey |
| 8,516,129 | B1 | 8/2013 | Skene |
| 8,566,452 | B1 | 10/2013 | Goodwin, III et al. |
| 8,588,066 | B2 | 11/2013 | Goel et al. |
| 8,630,291 | B2 | 1/2014 | Shaffer et al. |
| 8,661,295 | B1 | 2/2014 | Khanna et al. |
| 8,724,456 | B1 | 5/2014 | Hong et al. |
| 8,724,503 | B2 | 5/2014 | Johnsson et al. |
| 8,745,177 | B1 | 6/2014 | Kazerani et al. |
| 8,769,129 | B2 | 7/2014 | Watsen et al. |
| 8,797,874 | B2 | 8/2014 | Yu et al. |
| 8,799,504 | B2 | 8/2014 | Capone et al. |
| 8,804,745 | B1 | 8/2014 | Sinn |
| 8,806,482 | B1 | 8/2014 | Nagargadde et al. |
| 8,855,071 | B1 | 10/2014 | Sankaran et al. |
| 8,856,339 | B2 | 10/2014 | Mestery et al. |
| 8,964,548 | B1 | 2/2015 | Keralapura et al. |
| 8,989,199 | B1 | 3/2015 | Sella et al. |
| 9,009,217 | B1 | 4/2015 | Nagargadde et al. |
| 9,015,299 | B1 | 4/2015 | Shah |
| 9,019,837 | B2 | 4/2015 | Lue et al. |
| 9,055,000 | B1 | 6/2015 | Ghosh et al. |
| 9,060,025 | B2 | 6/2015 | Xu |
| 9,071,607 | B2 | 6/2015 | Twitchell, Jr. |
| 9,075,771 | B1 | 7/2015 | Gawali et al. |
| 9,100,329 | B1 | 8/2015 | Jiang et al. |
| 9,135,037 | B1 | 9/2015 | Petrescu-Prahova et al. |
| 9,137,334 | B2 | 9/2015 | Zhou |
| 9,154,327 | B1 | 10/2015 | Marino et al. |
| 9,203,764 | B2 | 12/2015 | Shirazipour et al. |
| 9,225,591 | B2 | 12/2015 | Beheshti-Zavareh et al. |
| 9,306,949 | B1 | 4/2016 | Richard et al. |
| 9,323,561 | B2 | 4/2016 | Ayala et al. |
| 9,336,040 | B2 | 5/2016 | Dong et al. |
| 9,354,983 | B1 | 5/2016 | Yenamandra et al. |
| 9,356,943 | B1 | 5/2016 | Lopilato et al. |
| 9,374,263 | B2 * | 6/2016 | Hughes ................... H04L 65/60 |
| 9,379,981 | B1 | 6/2016 | Zhou et al. |
| 9,413,724 | B2 | 8/2016 | Xu |
| 9,419,878 | B2 | 8/2016 | Hsiao et al. |
| 9,432,245 | B1 | 8/2016 | Sorenson et al. |
| 9,438,566 | B2 | 9/2016 | Zhang et al. |
| 9,450,817 | B1 | 9/2016 | Bahadur et al. |
| 9,450,852 | B1 | 9/2016 | Chen et al. |
| 9,462,010 | B1 | 10/2016 | Stevenson |
| 9,467,478 | B1 | 10/2016 | Khan et al. |
| 9,485,163 | B1 | 11/2016 | Fries et al. |
| 9,521,067 | B2 | 12/2016 | Michael et al. |
| 9,525,564 | B2 | 12/2016 | Lee |
| 9,542,219 | B1 | 1/2017 | Bryant et al. |
| 9,559,951 | B1 | 1/2017 | Sajassi et al. |
| 9,563,423 | B1 | 2/2017 | Pittman |
| 9,602,389 | B1 | 3/2017 | Maveli et al. |
| 9,608,917 | B1 | 3/2017 | Anderson et al. |
| 9,608,962 | B1 | 3/2017 | Chang |
| 9,614,748 | B1 | 4/2017 | Battersby et al. |
| 9,621,460 | B2 | 4/2017 | Mehta et al. |
| 9,641,551 | B1 | 5/2017 | Kariyanahalli |
| 9,648,547 | B1 | 5/2017 | Hart et al. |
| 9,665,432 | B2 | 5/2017 | Kruse et al. |
| 9,686,127 | B2 | 6/2017 | Ramachandran et al. |
| 9,692,714 | B1 | 6/2017 | Nair et al. |
| 9,715,401 | B2 | 7/2017 | Devine et al. |
| 9,717,021 | B2 | 7/2017 | Hughes et al. |
| 9,722,815 | B2 | 8/2017 | Mukundan et al. |
| 9,747,249 | B2 | 8/2017 | Cherian et al. |
| 9,755,965 | B1 | 9/2017 | Yadav et al. |
| 9,787,559 | B1 | 10/2017 | Schroeder |
| 9,807,004 | B2 | 10/2017 | Koley et al. |
| 9,819,540 | B1 | 11/2017 | Bahadur et al. |
| 9,819,565 | B2 | 11/2017 | Djukic et al. |
| 9,825,822 | B1 | 11/2017 | Holland |
| 9,825,911 | B1 | 11/2017 | Brandwine |
| 9,825,992 | B2 | 11/2017 | Xu |
| 9,832,128 | B1 | 11/2017 | Ashner et al. |
| 9,832,205 | B2 | 11/2017 | Santhi et al. |
| 9,875,355 | B1 | 1/2018 | Williams |
| 9,906,401 | B1 | 2/2018 | Rao |
| 9,923,826 | B2 | 3/2018 | Murgia |
| 9,930,011 | B1 | 3/2018 | Clemons, Jr. et al. |
| 9,935,829 | B1 | 4/2018 | Miller et al. |
| 9,942,787 | B1 | 4/2018 | Tillotson |
| 9,996,370 | B1 | 6/2018 | Khafizov et al. |
| 10,038,601 | B1 | 7/2018 | Becker et al. |
| 10,057,183 | B2 | 8/2018 | Salle et al. |
| 10,057,294 | B2 | 8/2018 | Xu |
| 10,116,593 | B1 | 10/2018 | Sinn et al. |
| 10,135,789 | B2 | 11/2018 | Mayya et al. |
| 10,142,226 | B1 | 11/2018 | Wu et al. |
| 10,178,032 | B1 | 1/2019 | Freitas |
| 10,178,037 | B2 | 1/2019 | Appleby et al. |
| 10,187,289 | B1 | 1/2019 | Chen et al. |
| 10,200,264 | B2 | 2/2019 | Menon et al. |
| 10,229,017 | B1 | 3/2019 | Zou et al. |
| 10,237,123 | B2 | 3/2019 | Dubey et al. |
| 10,250,498 | B1 | 4/2019 | Bales et al. |
| 10,263,832 | B1 | 4/2019 | Ghosh |
| 10,263,848 | B2 | 4/2019 | Wolting |
| 10,320,664 | B2 | 6/2019 | Nainar et al. |
| 10,320,691 | B1 | 6/2019 | Matthews et al. |
| 10,326,830 | B1 | 6/2019 | Singh |
| 10,348,767 | B1 | 7/2019 | Lee et al. |
| 10,355,989 | B1 | 7/2019 | Panchal et al. |
| 10,425,382 | B2 | 9/2019 | Mayya et al. |
| 10,454,708 | B2 | 10/2019 | Mibu |
| 10,454,714 | B2 | 10/2019 | Mayya et al. |
| 10,461,993 | B2 | 10/2019 | Turabi et al. |
| 10,498,652 | B2 | 12/2019 | Mayya et al. |
| 10,511,546 | B2 | 12/2019 | Singarayan et al. |
| 10,523,539 | B2 | 12/2019 | Mayya et al. |
| 10,550,093 | B2 | 2/2020 | Ojima et al. |
| 10,554,538 | B2 | 2/2020 | Spohn et al. |
| 10,560,431 | B1 | 2/2020 | Chen et al. |
| 10,565,464 | B2 | 2/2020 | Han et al. |
| 10,567,519 | B1 | 2/2020 | Mukhopadhyaya et al. |
| 10,574,482 | B2 | 2/2020 | Oré et al. |
| 10,574,528 | B2 | 2/2020 | Mayya et al. |

(56) References Cited

U.S. PATENT DOCUMENTS

| | | | |
|---|---|---|---|
| 10,594,516 B2 | 3/2020 | Cidon et al. | |
| 10,594,591 B2 | 3/2020 | Houjyo et al. | |
| 10,594,659 B2 | 3/2020 | El-Moussa et al. | |
| 10,608,844 B2 | 3/2020 | Cidon et al. | |
| 10,630,505 B2 | 4/2020 | Rubenstein et al. | |
| 10,637,889 B2 | 4/2020 | Ermagan et al. | |
| 10,666,460 B2 | 5/2020 | Cidon et al. | |
| 10,666,497 B2 | 5/2020 | Tahhan et al. | |
| 10,686,625 B2 | 6/2020 | Cidon et al. | |
| 10,693,739 B1 | 6/2020 | Naseri et al. | |
| 10,708,144 B2 | 7/2020 | Mohan et al. | |
| 10,715,382 B2 | 7/2020 | Guan et al. | |
| 10,715,427 B2 | 7/2020 | Raj et al. | |
| 10,749,711 B2 | 8/2020 | Mukundan et al. | |
| 10,778,466 B2 | 9/2020 | Cidon et al. | |
| 10,778,528 B2 | 9/2020 | Mayya et al. | |
| 10,778,557 B2 | 9/2020 | Ganichev et al. | |
| 10,805,114 B2 | 10/2020 | Cidon et al. | |
| 10,805,272 B2 | 10/2020 | Mayya et al. | |
| 10,819,564 B2 | 10/2020 | Turabi et al. | |
| 10,826,775 B1 | 11/2020 | Moreno et al. | |
| 10,841,131 B2 | 11/2020 | Cidon et al. | |
| 10,911,374 B1 | 2/2021 | Kumar et al. | |
| 10,924,388 B1 | 2/2021 | Burns et al. | |
| 10,938,693 B2 | 3/2021 | Mayya et al. | |
| 10,951,529 B2 | 3/2021 | Duan et al. | |
| 10,958,479 B2 | 3/2021 | Cidon et al. | |
| 10,959,098 B2 | 3/2021 | Cidon et al. | |
| 10,992,558 B1 | 4/2021 | Silva et al. | |
| 10,992,568 B2 | 4/2021 | Michael et al. | |
| 10,999,100 B2 | 5/2021 | Cidon et al. | |
| 10,999,137 B2 | 5/2021 | Cidon et al. | |
| 10,999,165 B2 | 5/2021 | Cidon et al. | |
| 10,999,197 B2 | 5/2021 | Hooda et al. | |
| 11,005,684 B2 | 5/2021 | Cidon | |
| 11,018,995 B2 | 5/2021 | Cidon et al. | |
| 11,044,190 B2 | 6/2021 | Ramaswamy et al. | |
| 11,050,588 B2 | 6/2021 | Mayya et al. | |
| 11,050,644 B2 | 6/2021 | Hegde et al. | |
| 11,071,005 B2 | 7/2021 | Shen et al. | |
| 11,089,111 B2 | 8/2021 | Markuze et al. | |
| 11,095,612 B1 | 8/2021 | Oswal et al. | |
| 11,102,032 B2 | 8/2021 | Cidon et al. | |
| 11,108,595 B2 | 8/2021 | Knutsen et al. | |
| 11,108,851 B1 | 8/2021 | Kurmala et al. | |
| 11,115,347 B2 | 9/2021 | Gupta et al. | |
| 11,115,426 B1 | 9/2021 | Pazhyannur et al. | |
| 11,115,480 B2 | 9/2021 | Markuze et al. | |
| 11,121,962 B2 | 9/2021 | Michael et al. | |
| 11,121,985 B2 | 9/2021 | Cidon et al. | |
| 11,128,492 B2 | 9/2021 | Sethi et al. | |
| 11,146,632 B2 | 10/2021 | Rubenstein | |
| 11,153,230 B2 | 10/2021 | Cidon et al. | |
| 11,171,885 B2 | 11/2021 | Cidon et al. | |
| 11,212,140 B2 | 12/2021 | Mukundan et al. | |
| 11,212,238 B2 | 12/2021 | Cidon et al. | |
| 11,223,514 B2 | 1/2022 | Mayya et al. | |
| 11,245,641 B2 | 2/2022 | Ramaswamy et al. | |
| 11,252,079 B2 | 2/2022 | Michael et al. | |
| 11,252,105 B2 | 2/2022 | Cidon et al. | |
| 11,252,106 B2 | 2/2022 | Cidon et al. | |
| 11,258,728 B2 | 2/2022 | Cidon et al. | |
| 11,310,170 B2 | 4/2022 | Cidon et al. | |
| 11,323,307 B2 | 5/2022 | Mayya et al. | |
| 11,349,722 B2 | 5/2022 | Mayya et al. | |
| 11,363,124 B2 | 6/2022 | Markuze et al. | |
| 11,374,904 B2 | 6/2022 | Mayya et al. | |
| 11,375,005 B1 | 6/2022 | Rolando et al. | |
| 11,381,474 B1 | 7/2022 | Kumar et al. | |
| 11,381,499 B1 | 7/2022 | Ramaswamy et al. | |
| 11,388,086 B1 | 7/2022 | Ramaswamy et al. | |
| 11,394,640 B2 | 7/2022 | Ramaswamy et al. | |
| 11,418,997 B2 | 8/2022 | Devadoss et al. | |
| 11,438,789 B2 | 9/2022 | Devadoss et al. | |
| 11,444,865 B2 | 9/2022 | Ramaswamy et al. | |
| 11,444,872 B2 | 9/2022 | Mayya et al. | |
| 11,477,127 B2 | 10/2022 | Ramaswamy et al. | |
| 11,489,720 B1 | 11/2022 | Kempanna et al. | |
| 11,489,783 B2 | 11/2022 | Ramaswamy et al. | |
| 11,509,571 B1 | 11/2022 | Ramaswamy et al. | |
| 11,516,049 B2 | 11/2022 | Cidon et al. | |
| 11,522,780 B1 | 12/2022 | Wallace et al. | |
| 11,526,434 B1 | 12/2022 | Brooker et al. | |
| 11,533,248 B2 | 12/2022 | Mayya et al. | |
| 11,552,874 B1 | 1/2023 | Pragada et al. | |
| 11,575,591 B2 | 2/2023 | Ramaswamy et al. | |
| 11,575,600 B2 | 2/2023 | Markuze et al. | |
| 11,582,144 B2 | 2/2023 | Ramaswamy et al. | |
| 11,582,298 B2 | 2/2023 | Hood et al. | |
| 11,601,356 B2 | 3/2023 | Gandhi et al. | |
| 11,606,225 B2 | 3/2023 | Cidon et al. | |
| 11,606,286 B2 | 3/2023 | Michael et al. | |
| 11,606,314 B2 | 3/2023 | Cidon et al. | |
| 11,606,712 B2 | 3/2023 | Devadoss et al. | |
| 11,611,507 B2 | 3/2023 | Ramaswamy et al. | |
| 11,637,768 B2 | 4/2023 | Ramaswamy et al. | |
| 11,677,720 B2 | 6/2023 | Mayya et al. | |
| 11,689,959 B2 | 6/2023 | Devadoss et al. | |
| 11,700,196 B2 | 7/2023 | Michael et al. | |
| 11,706,126 B2 | 7/2023 | Silva et al. | |
| 11,706,127 B2 | 7/2023 | Michael et al. | |
| 11,709,710 B2 | 7/2023 | Markuze et al. | |
| 11,716,286 B2 | 8/2023 | Ramaswamy et al. | |
| 11,722,925 B2 | 8/2023 | Devadoss et al. | |
| 11,729,065 B2 | 8/2023 | Ramaswamy et al. | |
| 2002/0049687 A1 | 4/2002 | Helsper et al. | |
| 2002/0075542 A1 | 6/2002 | Kumar et al. | |
| 2002/0085488 A1 | 7/2002 | Kobayashi | |
| 2002/0087716 A1 | 7/2002 | Mustafa | |
| 2002/0152306 A1 | 10/2002 | Tuck | |
| 2002/0186682 A1 | 12/2002 | Kawano et al. | |
| 2002/0198840 A1 | 12/2002 | Banka et al. | |
| 2003/0050061 A1 | 3/2003 | Wu et al. | |
| 2003/0061269 A1 | 3/2003 | Hathaway et al. | |
| 2003/0088697 A1 | 5/2003 | Matsuhira | |
| 2003/0112766 A1 | 6/2003 | Riedel et al. | |
| 2003/0112808 A1 | 6/2003 | Solomon | |
| 2003/0126468 A1 | 7/2003 | Markham | |
| 2003/0161313 A1 | 8/2003 | Jinmei et al. | |
| 2003/0161321 A1 | 8/2003 | Karam et al. | |
| 2003/0189919 A1 | 10/2003 | Gupta et al. | |
| 2003/0202506 A1 | 10/2003 | Perkins et al. | |
| 2003/0219030 A1 | 11/2003 | Gubbi | |
| 2004/0059831 A1 | 3/2004 | Chu et al. | |
| 2004/0062248 A1* | 4/2004 | Nagarajan | H04L 45/00 |
| | | | 370/394 |
| 2004/0068668 A1 | 4/2004 | Lor et al. | |
| 2004/0165601 A1 | 8/2004 | Liu et al. | |
| 2004/0224771 A1 | 11/2004 | Chen et al. | |
| 2005/0078690 A1 | 4/2005 | DeLangis | |
| 2005/0094632 A1* | 5/2005 | Hebsgaard | H04L 1/0083 |
| | | | 370/389 |
| 2005/0149604 A1 | 7/2005 | Navada | |
| 2005/0154790 A1 | 7/2005 | Nagata et al. | |
| 2005/0172161 A1 | 8/2005 | Cruz et al. | |
| 2005/0195754 A1 | 9/2005 | Nosella | |
| 2005/0210479 A1 | 9/2005 | Andjelic | |
| 2005/0265255 A1 | 12/2005 | Kodialam et al. | |
| 2006/0002291 A1 | 1/2006 | Alicherry et al. | |
| 2006/0034335 A1 | 2/2006 | Karaoguz et al. | |
| 2006/0114838 A1 | 6/2006 | Mandavilli et al. | |
| 2006/0171365 A1 | 8/2006 | Borella | |
| 2006/0182034 A1 | 8/2006 | Klinker et al. | |
| 2006/0182035 A1 | 8/2006 | Vasseur | |
| 2006/0193247 A1 | 8/2006 | Naseh et al. | |
| 2006/0193252 A1 | 8/2006 | Naseh et al. | |
| 2006/0195605 A1 | 8/2006 | Sundarrajan et al. | |
| 2006/0245414 A1 | 11/2006 | Susai et al. | |
| 2007/0050594 A1 | 3/2007 | Augsburg et al. | |
| 2007/0064604 A1 | 3/2007 | Chen et al. | |
| 2007/0064702 A1 | 3/2007 | Bates et al. | |
| 2007/0083727 A1 | 4/2007 | Johnston et al. | |
| 2007/0091794 A1 | 4/2007 | Filsfils et al. | |
| 2007/0103548 A1 | 5/2007 | Carter | |

(56) References Cited

U.S. PATENT DOCUMENTS

| | | |
|---|---|---|
| 2007/0115812 A1 | 5/2007 | Hughes |
| 2007/0121486 A1 | 5/2007 | Guichard et al. |
| 2007/0130325 A1 | 6/2007 | Lesser |
| 2007/0162619 A1 | 7/2007 | Aloni et al. |
| 2007/0162639 A1 | 7/2007 | Chu et al. |
| 2007/0177511 A1 | 8/2007 | Das et al. |
| 2007/0195797 A1 | 8/2007 | Patel et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0168086 A1 | 7/2008 | Miller et al. |
| 2008/0175150 A1 | 7/2008 | Bolt et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2008/0244739 A1* | 10/2008 | Liu ..................... H04L 63/1466 |
| | | 726/22 |
| 2008/0263218 A1 | 10/2008 | Beerends et al. |
| 2009/0013210 A1 | 1/2009 | McIntosh et al. |
| 2009/0016366 A1* | 1/2009 | Endo ........................ H04L 45/22 |
| | | 370/401 |
| 2009/0028092 A1 | 1/2009 | Rothschild |
| 2009/0125617 A1 | 5/2009 | Klessig et al. |
| 2009/0141642 A1 | 6/2009 | Sun |
| 2009/0154463 A1 | 6/2009 | Hines et al. |
| 2009/0182874 A1 | 7/2009 | Morford et al. |
| 2009/0247204 A1 | 10/2009 | Sennett et al. |
| 2009/0268605 A1 | 10/2009 | Campbell et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0002591 A1* | 1/2010 | Mizutani ............ H04Q 11/0062 |
| | | 370/468 |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091782 A1 | 4/2010 | Hiscock |
| 2010/0091823 A1 | 4/2010 | Retana et al. |
| 2010/0098092 A1 | 4/2010 | Luo et al. |
| 2010/0100768 A1 | 4/2010 | Yamamoto et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0128600 A1 | 5/2010 | Srinivasmurthy et al. |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0001604 A1 | 1/2011 | Ludlow et al. |
| 2011/0007752 A1 | 1/2011 | Silva et al. |
| 2011/0032939 A1 | 2/2011 | Nozaki et al. |
| 2011/0035187 A1 | 2/2011 | DeJori et al. |
| 2011/0040814 A1 | 2/2011 | Higgins |
| 2011/0075674 A1 | 3/2011 | Li et al. |
| 2011/0078783 A1 | 3/2011 | Duan et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0154146 A1* | 6/2011 | Shin ..................... H04L 1/1832 |
| | | 714/749 |
| 2011/0182294 A1* | 7/2011 | Lee ........................ H04L 47/34 |
| | | 370/394 |
| 2011/0235509 A1 | 9/2011 | Szymanski |
| 2011/0255397 A1 | 10/2011 | Kadakia et al. |
| 2011/0302663 A1 | 12/2011 | Prodan et al. |
| 2012/0008630 A1 | 1/2012 | Ould-Brahim |
| 2012/0027013 A1 | 2/2012 | Napierala |
| 2012/0039309 A1 | 2/2012 | Evans et al. |
| 2012/0099601 A1 | 4/2012 | Haddad et al. |
| 2012/0136697 A1 | 5/2012 | Peles et al. |
| 2012/0140935 A1 | 6/2012 | Kruglick |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shatzkamer et al. |
| 2012/0240185 A1 | 9/2012 | Kapoor et al. |
| 2012/0250682 A1 | 10/2012 | Vincent et al. |
| 2012/0250686 A1 | 10/2012 | Vincent et al. |
| 2012/0266026 A1 | 10/2012 | Chikkalingaiah et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0007505 A1 | 1/2013 | Spear |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1 | 4/2013 | Asthana et al. |
| 2013/0103729 A1 | 4/2013 | Cooney et al. |
| 2013/0103834 A1 | 4/2013 | Dzerve et al. |
| 2013/0117530 A1 | 5/2013 | Kim et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128757 A1 | 5/2013 | Chowdhary et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173768 A1 | 7/2013 | Kundu et al. |
| 2013/0173788 A1 | 7/2013 | Song |
| 2013/0182712 A1 | 7/2013 | Aguayo et al. |
| 2013/0185446 A1 | 7/2013 | Zeng et al. |
| 2013/0185729 A1 | 7/2013 | Vasic et al. |
| 2013/0191688 A1 | 7/2013 | Agarwal et al. |
| 2013/0223226 A1 | 8/2013 | Narayanan et al. |
| 2013/0223454 A1 | 8/2013 | Dunbar et al. |
| 2013/0235870 A1 | 9/2013 | Tripathi et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0258939 A1 | 10/2013 | Wang |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Mn et al. |
| 2013/0329734 A1 | 12/2013 | Chesla et al. |
| 2013/0346470 A1 | 12/2013 | Obstfeld et al. |
| 2014/0016464 A1 | 1/2014 | Shirazipour et al. |

(56) References Cited

U.S. PATENT DOCUMENTS

| | | |
|---|---|---|
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0122559 A1 | 5/2014 | Branson et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0157363 A1 | 6/2014 | Banerjee |
| 2014/0160935 A1 | 6/2014 | Zecharia et al. |
| 2014/0164560 A1 | 6/2014 | Ko et al. |
| 2014/0164617 A1 | 6/2014 | Jalan et al. |
| 2014/0164718 A1 | 6/2014 | Schaik et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0189074 A1 | 7/2014 | Parker |
| 2014/0208317 A1 | 7/2014 | Nakagawa |
| 2014/0219135 A1 | 8/2014 | Li et al. |
| 2014/0223507 A1 | 8/2014 | Xu |
| 2014/0226664 A1 | 8/2014 | Chen et al. |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0310282 A1 | 10/2014 | Sprague et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0337674 A1 | 11/2014 | Ivancic et al. |
| 2014/0341109 A1 | 11/2014 | Cartmell et al. |
| 2014/0351394 A1 | 11/2014 | Elisha |
| 2014/0355441 A1 | 12/2014 | Jain |
| 2014/0365834 A1 | 12/2014 | Stone et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0100958 A1 | 4/2015 | Banavalikar et al. |
| 2015/0106809 A1 | 4/2015 | Reddy et al. |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0264055 A1 | 9/2015 | Budhani et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0326426 A1 | 11/2015 | Luo et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358232 A1 | 12/2015 | Chen et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381462 A1 | 12/2015 | Choi et al. |
| 2015/0381493 A1 | 12/2015 | Bansal et al. |
| 2016/0019317 A1 | 1/2016 | Pawar et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0043983 A1* | 2/2016 | Bishop .................. H04L 51/42 |
| | | 709/206 |
| 2016/0072669 A1 | 3/2016 | Saavedra |
| 2016/0072684 A1 | 3/2016 | Manuguri et al. |
| 2016/0080268 A1 | 3/2016 | Anand et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134527 A1 | 5/2016 | Kwak et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0147607 A1 | 5/2016 | Dornemann et al. |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0205071 A1 | 7/2016 | Cooper et al. |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Vasseur et al. |
| 2016/0234099 A1 | 8/2016 | Jiao |
| 2016/0234161 A1 | 8/2016 | Banerjee et al. |
| 2016/0255169 A1 | 9/2016 | Kovvuri et al. |
| 2016/0255542 A1 | 9/2016 | Hughes et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |
| 2016/0299775 A1 | 10/2016 | Madapurath et al. |
| 2016/0301471 A1 | 10/2016 | Kunz et al. |
| 2016/0308762 A1 | 10/2016 | Teng et al. |

(56) References Cited

U.S. PATENT DOCUMENTS

| | | |
|---|---|---|
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0337202 A1 | 11/2016 | Ben-Itzhak et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0378527 A1 | 12/2016 | Zamir |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0024260 A1 | 1/2017 | Chandrasekaran et al. |
| 2017/0026273 A1 | 1/2017 | Yao et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063783 A1 | 3/2017 | Yong et al. |
| 2017/0063794 A1 | 3/2017 | Jain et al. |
| 2017/0064005 A1 | 3/2017 | Lee |
| 2017/0075710 A1 | 3/2017 | Prasad et al. |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118067 A1 | 4/2017 | Vedula |
| 2017/0118173 A1 | 4/2017 | Arramreddy et al. |
| 2017/0123939 A1 | 5/2017 | Maheshwari et al. |
| 2017/0126475 A1 | 5/2017 | Mahkonen et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0155566 A1 | 6/2017 | Martinsen et al. |
| 2017/0155590 A1 | 6/2017 | Dillon et al. |
| 2017/0163473 A1 | 6/2017 | Sadana et al. |
| 2017/0171024 A1 | 6/2017 | Anerousis et al. |
| 2017/0171310 A1 | 6/2017 | Gardner |
| 2017/0180220 A1 | 6/2017 | Leckey et al. |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201568 A1 | 7/2017 | Hussam et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0222943 A1* | 8/2017 | Yao ...................... H04L 69/168 |
| 2017/0223117 A1 | 8/2017 | Messerli et al. |
| 2017/0236060 A1 | 8/2017 | Ignatyev |
| 2017/0237710 A1 | 8/2017 | Mayya et al. |
| 2017/0242784 A1 | 8/2017 | Heorhiadi et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279741 A1 | 9/2017 | Elias et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0289027 A1 | 10/2017 | Ratnasingham |
| 2017/0295264 A1 | 10/2017 | Touitou et al. |
| 2017/0302501 A1 | 10/2017 | Shi et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317945 A1 | 11/2017 | Guo et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0324628 A1 | 11/2017 | Dhanabalan |
| 2017/0337086 A1 | 11/2017 | Zhu et al. |
| 2017/0339022 A1 | 11/2017 | Hegde et al. |
| 2017/0339054 A1 | 11/2017 | Yadav et al. |
| 2017/0339070 A1 | 11/2017 | Chang et al. |
| 2017/0346722 A1 | 11/2017 | Smith et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi et al. |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0041470 A1 | 2/2018 | Schultz et al. |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0091370 A1 | 3/2018 | Arai |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0123946 A1 | 5/2018 | Ramachandran et al. |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0176252 A1 | 6/2018 | Nimmagadda et al. |
| 2018/0181423 A1 | 6/2018 | Gunda et al. |
| 2018/0205746 A1 | 7/2018 | Boutnaru et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0248790 A1 | 8/2018 | Tan et al. |
| 2018/0260125 A1 | 9/2018 | Botes et al. |
| 2018/0261085 A1 | 9/2018 | Liu et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |

(56) References Cited

U.S. PATENT DOCUMENTS

| | | |
|---|---|---|
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0359323 A1 | 12/2018 | Madden |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0021085 A1 | 1/2019 | Mochizuki et al. |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0081894 A1 | 3/2019 | Yousaf et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0132234 A1 | 5/2019 | Dong et al. |
| 2019/0132322 A1 | 5/2019 | Song et al. |
| 2019/0140889 A1 | 5/2019 | Mayya et al. |
| 2019/0140890 A1 | 5/2019 | Mayya et al. |
| 2019/0149421 A1* | 5/2019 | Jin .................... H04W 36/0064 |
| | | 370/331 |
| 2019/0149525 A1 | 5/2019 | Gunda et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0222499 A1 | 7/2019 | Chen et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0238497 A1 | 8/2019 | Tourrilhes et al. |
| 2019/0268421 A1 | 8/2019 | Markuze et al. |
| 2019/0268973 A1 | 8/2019 | Bull et al. |
| 2019/0278631 A1 | 9/2019 | Bernat et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0288875 A1 | 9/2019 | Shen et al. |
| 2019/0306197 A1 | 10/2019 | Degioanni |
| 2019/0306282 A1 | 10/2019 | Masputra et al. |
| 2019/0313278 A1 | 10/2019 | Liu |
| 2019/0313907 A1 | 10/2019 | Khachaturian et al. |
| 2019/0319847 A1 | 10/2019 | Nahar et al. |
| 2019/0319881 A1 | 10/2019 | Maskara et al. |
| 2019/0327109 A1 | 10/2019 | Guichard et al. |
| 2019/0334786 A1 | 10/2019 | Dutta et al. |
| 2019/0334813 A1 | 10/2019 | Raj et al. |
| 2019/0334820 A1 | 10/2019 | Zhao |
| 2019/0342201 A1 | 11/2019 | Singh |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1 | 12/2019 | Tahhan et al. |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0044969 A1 | 2/2020 | Hao et al. |
| 2020/0059420 A1 | 2/2020 | Abraham |
| 2020/0059457 A1 | 2/2020 | Raza et al. |
| 2020/0059459 A1 | 2/2020 | Abraham et al. |
| 2020/0067831 A1 | 2/2020 | Spraggins et al. |
| 2020/0092207 A1 | 3/2020 | Sipra et al. |
| 2020/0097327 A1 | 3/2020 | Beyer et al. |
| 2020/0099625 A1 | 3/2020 | Mgit et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0159661 A1 | 5/2020 | Keymolen et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0220805 A1* | 7/2020 | Dhanabalan .......... H04L 41/046 |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0241927 A1 | 7/2020 | Yang et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0267203 A1 | 8/2020 | Jindal et al. |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0301764 A1 | 9/2020 | Thoresen et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0322287 A1 | 10/2020 | Connor et al. |
| 2020/0336336 A1 | 10/2020 | Sethi et al. |
| 2020/0344089 A1 | 10/2020 | Motwani et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |

(56) References Cited

U.S. PATENT DOCUMENTS

| | | | |
|---|---|---|---|
| 2020/0366562 A1 | 11/2020 | Mayya et al. | |
| 2020/0382345 A1 | 12/2020 | Zhao et al. | |
| 2020/0382387 A1 | 12/2020 | Pasupathy et al. | |
| 2020/0403821 A1 | 12/2020 | Dev et al. | |
| 2020/0412483 A1 | 12/2020 | Tan et al. | |
| 2020/0412576 A1 | 12/2020 | Kondapavuluru et al. | |
| 2020/0413283 A1 | 12/2020 | Shen et al. | |
| 2021/0006482 A1 | 1/2021 | Hwang et al. | |
| 2021/0006490 A1 | 1/2021 | Michael et al. | |
| 2021/0021538 A1 | 1/2021 | Meck et al. | |
| 2021/0029019 A1 | 1/2021 | Kottapalli | |
| 2021/0029088 A1 | 1/2021 | Mayya et al. | |
| 2021/0036888 A1 | 2/2021 | Makkalla et al. | |
| 2021/0036987 A1 | 2/2021 | Mishra et al. | |
| 2021/0037159 A1 | 2/2021 | Shimokawa | |
| 2021/0049191 A1 | 2/2021 | Masson et al. | |
| 2021/0067372 A1 | 3/2021 | Cidon et al. | |
| 2021/0067373 A1 | 3/2021 | Cidon et al. | |
| 2021/0067374 A1 | 3/2021 | Cidon et al. | |
| 2021/0067375 A1 | 3/2021 | Cidon et al. | |
| 2021/0067407 A1 | 3/2021 | Cidon et al. | |
| 2021/0067427 A1 | 3/2021 | Cidon et al. | |
| 2021/0067442 A1 | 3/2021 | Sundararajan et al. | |
| 2021/0067461 A1 | 3/2021 | Cidon et al. | |
| 2021/0067464 A1 | 3/2021 | Cidon et al. | |
| 2021/0067467 A1 | 3/2021 | Cidon et al. | |
| 2021/0067468 A1 | 3/2021 | Cidon et al. | |
| 2021/0073001 A1 | 3/2021 | Rogers et al. | |
| 2021/0092062 A1 | 3/2021 | Dhanabalan et al. | |
| 2021/0099360 A1 | 4/2021 | Parsons et al. | |
| 2021/0105199 A1 | 4/2021 | C H et al. | |
| 2021/0111998 A1 | 4/2021 | Saavedra | |
| 2021/0112034 A1 | 4/2021 | Sundararajan et al. | |
| 2021/0126830 A1 | 4/2021 | R. et al. | |
| 2021/0126853 A1 | 4/2021 | Ramaswamy et al. | |
| 2021/0126854 A1 | 4/2021 | Guo et al. | |
| 2021/0126860 A1 | 4/2021 | Ramaswamy et al. | |
| 2021/0144091 A1 | 5/2021 | C H et al. | |
| 2021/0160169 A1 | 5/2021 | Shen et al. | |
| 2021/0160813 A1 | 5/2021 | Gupta et al. | |
| 2021/0176255 A1 | 6/2021 | Hill et al. | |
| 2021/0184952 A1 | 6/2021 | Mayya et al. | |
| 2021/0184966 A1 | 6/2021 | Ramaswamy et al. | |
| 2021/0184983 A1 | 6/2021 | Ramaswamy et al. | |
| 2021/0185747 A1* | 6/2021 | Kanamarlapudi | H04L 1/08 |
| 2021/0194814 A1 | 6/2021 | Roux et al. | |
| 2021/0226880 A1 | 7/2021 | Ramamoorthy et al. | |
| 2021/0234728 A1 | 7/2021 | Cidon et al. | |
| 2021/0234775 A1 | 7/2021 | Devadoss et al. | |
| 2021/0234786 A1 | 7/2021 | Devadoss et al. | |
| 2021/0234804 A1 | 7/2021 | Devadoss et al. | |
| 2021/0234805 A1 | 7/2021 | Devadoss et al. | |
| 2021/0235312 A1 | 7/2021 | Devadoss et al. | |
| 2021/0235313 A1 | 7/2021 | Devadoss et al. | |
| 2021/0266262 A1 | 8/2021 | Subramanian et al. | |
| 2021/0279069 A1 | 9/2021 | Salgaonkar et al. | |
| 2021/0314289 A1 | 10/2021 | Chandrashekhar et al. | |
| 2021/0314385 A1 | 10/2021 | Pande et al. | |
| 2021/0328835 A1 | 10/2021 | Mayya et al. | |
| 2021/0336880 A1 | 10/2021 | Gupta et al. | |
| 2021/0377109 A1 | 12/2021 | Shrivastava et al. | |
| 2021/0377156 A1 | 12/2021 | Michael et al. | |
| 2021/0385169 A1* | 12/2021 | Urman | H04L 1/08 |
| 2021/0392060 A1 | 12/2021 | Silva et al. | |
| 2021/0392070 A1 | 12/2021 | Tootaghaj et al. | |
| 2021/0392171 A1 | 12/2021 | Srinivas et al. | |
| 2021/0399920 A1 | 12/2021 | Sundararajan et al. | |
| 2021/0399978 A9 | 12/2021 | Michael et al. | |
| 2021/0400113 A1 | 12/2021 | Markuze et al. | |
| 2021/0400512 A1 | 12/2021 | Agarwal et al. | |
| 2021/0409277 A1 | 12/2021 | Jeuk et al. | |
| 2022/0006726 A1 | 1/2022 | Michael et al. | |
| 2022/0006751 A1 | 1/2022 | Ramaswamy et al. | |
| 2022/0006756 A1 | 1/2022 | Ramaswamy et al. | |
| 2022/0029902 A1 | 1/2022 | Shemer et al. | |
| 2022/0035673 A1 | 2/2022 | Markuze et al. | |
| 2022/0038370 A1 | 2/2022 | Vasseur et al. | |
| 2022/0038557 A1 | 2/2022 | Markuze et al. | |
| 2022/0045927 A1 | 2/2022 | Liu et al. | |
| 2022/0052928 A1 | 2/2022 | Sundararajan et al. | |
| 2022/0061059 A1 | 2/2022 | Dunsmore et al. | |
| 2022/0086035 A1 | 3/2022 | Devaraj et al. | |
| 2022/0094644 A1 | 3/2022 | Cidon et al. | |
| 2022/0123961 A1 | 4/2022 | Mukundan et al. | |
| 2022/0131740 A1 | 4/2022 | Mayya et al. | |
| 2022/0131807 A1 | 4/2022 | Srinivas et al. | |
| 2022/0131898 A1 | 4/2022 | Hooda et al. | |
| 2022/0141184 A1 | 5/2022 | Oswal et al. | |
| 2022/0158923 A1 | 5/2022 | Ramaswamy et al. | |
| 2022/0158924 A1 | 5/2022 | Ramaswamy et al. | |
| 2022/0158926 A1 | 5/2022 | Wennerström et al. | |
| 2022/0166713 A1 | 5/2022 | Markuze et al. | |
| 2022/0191719 A1 | 6/2022 | Roy | |
| 2022/0198229 A1 | 6/2022 | López et al. | |
| 2022/0210035 A1 | 6/2022 | Hendrickson et al. | |
| 2022/0210041 A1 | 6/2022 | Gandhi et al. | |
| 2022/0210042 A1 | 6/2022 | Gandhi et al. | |
| 2022/0210122 A1 | 6/2022 | Levin et al. | |
| 2022/0217015 A1 | 7/2022 | Vuggrala et al. | |
| 2022/0231949 A1 | 7/2022 | Ramaswamy et al. | |
| 2022/0231950 A1 | 7/2022 | Ramaswamy et al. | |
| 2022/0232411 A1 | 7/2022 | Vijayakumar et al. | |
| 2022/0239596 A1 | 7/2022 | Kumar et al. | |
| 2022/0294701 A1 | 9/2022 | Mayya et al. | |
| 2022/0335027 A1 | 10/2022 | Seshadri et al. | |
| 2022/0337553 A1 | 10/2022 | Mayya et al. | |
| 2022/0353152 A1 | 11/2022 | Ramaswamy | |
| 2022/0353171 A1 | 11/2022 | Ramaswamy et al. | |
| 2022/0353175 A1 | 11/2022 | Ramaswamy et al. | |
| 2022/0353182 A1 | 11/2022 | Ramaswamy et al. | |
| 2022/0353190 A1 | 11/2022 | Ramaswamy et al. | |
| 2022/0360500 A1 | 11/2022 | Ramaswamy et al. | |
| 2022/0385588 A1* | 12/2022 | St-Denis | H04L 47/34 |
| 2022/0386333 A1* | 12/2022 | Mochizuki | H04W 76/14 |
| 2022/0407773 A1 | 12/2022 | Kempanna et al. | |
| 2022/0407774 A1 | 12/2022 | Kempanna et al. | |
| 2022/0407790 A1 | 12/2022 | Kempanna et al. | |
| 2022/0407820 A1 | 12/2022 | Kempanna et al. | |
| 2022/0407915 A1 | 12/2022 | Kempanna et al. | |
| 2022/0416947 A1* | 12/2022 | St-Denis | H04L 1/003 |
| 2023/0006929 A1 | 1/2023 | Mayya et al. | |
| 2023/0025586 A1 | 1/2023 | Rolando et al. | |
| 2023/0026330 A1 | 1/2023 | Rolando et al. | |
| 2023/0026865 A1 | 1/2023 | Rolando et al. | |
| 2023/0028872 A1 | 1/2023 | Ramaswamy | |
| 2023/0039869 A1 | 2/2023 | Ramaswamy et al. | |
| 2023/0041916 A1 | 2/2023 | Zhang et al. | |
| 2023/0054961 A1 | 2/2023 | Ramaswamy et al. | |
| 2023/0105680 A1 | 4/2023 | Simlai et al. | |
| 2023/0121871 A1 | 4/2023 | Mayya et al. | |
| 2023/0164158 A1 | 5/2023 | Fellows et al. | |
| 2023/0179445 A1 | 6/2023 | Cidon et al. | |
| 2023/0179502 A1 | 6/2023 | Ramaswamy et al. | |
| 2023/0179521 A1 | 6/2023 | Markuze et al. | |
| 2023/0179543 A1 | 6/2023 | Cidon et al. | |
| 2023/0216768 A1 | 7/2023 | Zohar et al. | |
| 2023/0216801 A1 | 7/2023 | Markuze et al. | |
| 2023/0216804 A1* | 7/2023 | Zohar | H04L 45/24 709/238 |
| 2023/0221874 A1 | 7/2023 | Markuze et al. | |
| 2023/0224356 A1 | 7/2023 | Markuze et al. | |
| 2023/0224759 A1 | 7/2023 | Ramaswamy | |
| 2023/0231845 A1 | 7/2023 | Manoharan et al. | |
| 2023/0239234 A1 | 7/2023 | Zohar et al. | |
| 2023/0261974 A1 | 8/2023 | Ramaswamy et al. | |
| 2023/0308421 A1 | 9/2023 | Mayya et al. | |
| 2025/0132999 A1* | 4/2025 | Varga | H04L 47/32 |

FOREIGN PATENT DOCUMENTS

| | | | |
|---|---|---|---|
| CN | 102577270 A | 7/2012 | |
| CN | 102811165 A | 12/2012 | |
| CN | 104205757 A | 12/2014 | |
| CN | 104956329 A | 9/2015 | |

(56) References Cited

FOREIGN PATENT DOCUMENTS

| | | | | |
|---|---|---|---|---|
| CN | 106230650 A | | 12/2016 | |
| CN | 106656847 A | | 5/2017 | |
| CN | 106998284 A | | 8/2017 | |
| CN | 108540380 A | * | 9/2018 | H04L 47/621 |
| CN | 110447209 A | | 11/2019 | |
| CN | 111198764 A | | 5/2020 | |
| CN | 113612698 A | * | 11/2021 | H04L 47/125 |
| CN | 116074884 A | * | 5/2023 | H04L 25/0212 |
| EP | 1031224 B1 | | 3/2005 | |
| EP | 1912381 A1 | | 4/2008 | |
| EP | 1551113 B1 | * | 10/2009 | H04W 36/18 |
| EP | 2538637 A2 | | 12/2012 | |
| EP | 2763362 A1 | | 8/2014 | |
| EP | 3041178 A1 | | 7/2016 | |
| EP | 3297211 A1 | | 3/2018 | |
| EP | 3509256 A1 | | 7/2019 | |
| EP | 3346650 B1 | | 11/2019 | |
| EP | 4113903 A1 | * | 1/2023 | H04L 1/203 |
| EP | 4141652 A2 | * | 3/2023 | H04L 69/22 |
| JP | 2002368792 A | | 12/2002 | |
| JP | 2010233126 A | | 10/2010 | |
| JP | 2010278845 A | * | 12/2010 | |
| JP | 2014200010 A | | 10/2014 | |
| JP | 2015228541 A | * | 12/2015 | |
| JP | 2015231091 A | * | 12/2015 | |
| JP | 2017059991 A | | 3/2017 | |
| JP | 2017524290 A | | 8/2017 | |
| KR | 20090122962 A | * | 12/2009 | H04L 65/40 |
| KR | 20170058201 A | | 5/2017 | |
| KR | 20180013597 A | * | 2/2018 | H04L 47/27 |
| KR | 20190017604 A | * | 2/2019 | H04L 47/34 |
| RU | 2574350 C2 | | 2/2016 | |
| WO | 2000078004 A2 | | 12/2000 | |
| WO | 03073701 A1 | | 9/2003 | |
| WO | 2005071861 A1 | | 8/2005 | |
| WO | 2007016834 A1 | | 2/2007 | |
| WO | WO-2007083687 A1 | * | 7/2007 | H04W 28/06 |
| WO | WO-2007098676 A1 | * | 9/2007 | H04L 49/90 |
| WO | WO-2009056638 A1 | * | 5/2009 | H04J 3/0667 |
| WO | 2012167184 A2 | | 12/2012 | |
| WO | WO-2014172896 A1 | * | 10/2014 | H04W 24/10 |
| WO | WO-2014177099 A1 | * | 11/2014 | H04L 47/624 |
| WO | WO-2015016919 A1 | * | 2/2015 | H04L 47/283 |
| WO | 2015092565 A1 | | 6/2015 | |
| WO | 2016061546 A1 | | 4/2016 | |
| WO | 2016123314 A1 | | 8/2016 | |
| WO | WO-2016156425 A1 | * | 10/2016 | H04L 45/70 |
| WO | 2017083975 A1 | | 5/2017 | |
| WO | 2019070611 A1 | | 4/2019 | |
| WO | 2019094522 A1 | | 5/2019 | |
| WO | 2020012491 A1 | | 1/2020 | |
| WO | 2020018704 A1 | | 1/2020 | |
| WO | 2020091777 A1 | | 5/2020 | |
| WO | 2020101922 A1 | | 5/2020 | |
| WO | 2020112345 A1 | | 6/2020 | |
| WO | WO-2021005397 A1 | * | 1/2021 | H04L 47/34 |
| WO | 2021040934 A1 | | 3/2021 | |
| WO | 2021118717 A1 | | 6/2021 | |
| WO | 2021150465 A1 | | 7/2021 | |
| WO | WO-2021180910 A1 | * | 9/2021 | H04L 47/34 |
| WO | 2021211906 A1 | | 10/2021 | |
| WO | 2022005607 A1 | | 1/2022 | |
| WO | WO-2022066077 A1 | * | 3/2022 | H04W 72/1268 |
| WO | 2022082680 A1 | | 4/2022 | |
| WO | 2022154850 A1 | | 7/2022 | |
| WO | 2022159156 A1 | | 7/2022 | |
| WO | 2022231668 A1 | | 11/2022 | |
| WO | 2022235303 A1 | | 11/2022 | |
| WO | 2022265681 A1 | | 12/2022 | |
| WO | 2023009159 A1 | | 2/2023 | |

OTHER PUBLICATIONS

Non-Published Commonly Owned U.S. Appl. No. 18/197,090, filed May 14, 2023, 36 pages, Nicira, Inc.

Non-Published Commonly Owned U.S. Appl. No. 18/211,568, filed Jun. 19, 2023, 37 pages, VMware, Inc.
Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.
Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.
Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.
Barozet, Jean-Marc, "Cisco SDWAN," Deep Dive, Dec. 2017, 185 pages, Cisco, Retrieved from https://www.coursehero.com/file/71671376/Cisco-SDWAN-Deep-Divepdf/.
Bertaux, Lionel, et al., "Software Defined Networking and Virtualization for Broadband Satellite Networks, " IEEE Communications Magazine, Mar. 18, 2015, 7 pages, vol. 53, IEEE, retrieved from https://ieeexplore.ieee.org/document/7060482.
Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.
Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.
Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.
Fortz, Bernard, et al., "Internet Traffic Engineering by Optimizing OSPF Weights," Proceedings IEEE Infocom 2000, Conference on Computer Communications, Nineteenth Annual Joint Conference of the IEEE Computer and Communications Societies, Mar. 26-30, 2000, 11 pages, IEEE, Tel Aviv, Israel, Israel.
Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MAS-COTS), Sep. 19-21, 2016, 10 pages, IEEE, London, UK.
Guo, Xiangyi, et al., (U.S. Appl. No. 62/925,193), filed Oct. 23, 2019, 26 pages.
Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.
Jivorasetkul, Supalerk, et al., "End-to-End Header Compression over Software-Defined Networks: a Low Latency Network Architecture," 2012 Fourth International Conference on Intelligent Networking and Collaborative Systems, Sep. 19-21, 2012, 2 pages, IEEE, Bucharest, Romania.
Lasserre, Marc, et al., "Framework for Data Center (DC) Network Virtualization," RFC 7365, Oct. 2014, 26 pages, IETF.
Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.
Lin, Weidong, et al., "Using Path Label Routing in Wide Area Software-Defined Networks with Open Flow," 2016 International Conference on Networking and Network Applications, Jul. 2016, 6 pages, IEEE.
Long, Feng, "Research and Application of Cloud Storage Technology in University Information Service," Chinese Excellent Masters' Theses Full-text Database, Mar. 2013, 72 pages, China Academic Journals Electronic Publishing House, China.
Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.
Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

(56) References Cited

OTHER PUBLICATIONS

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.
Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.
Non-Published Commonly Owned U.S. Appl. No. 17/574,225, filed Jan. 12, 2022, 56 pages, VMware, Inc.
Non-Published Commonly Owned U.S. Appl. No. 17/574,236, filed Jan. 12, 2022, 54 pages, VMware, Inc.
Non-Published Commonly Owned U.S. Appl. No. 17/695,264, filed Mar. 15, 2022, 28 pages, VMware, Inc.
Non-Published Commonly Owned U.S. Appl. No. 17/833,555, filed Jun. 6, 2022, 34 pages, VMware, Inc.
Non-Published Commonly Owned U.S. Appl. No. 17/833,566, filed Jun. 6, 2022, 35 pages, VMware, Inc.
Non-Published Commonly Owned U.S. Appl. No. 17/966,814, filed Oct. 15, 2022, 176 pages, VMware, Inc.
Non-Published Commonly Owned U.S. Appl. No. 17/966,820, filed Oct. 15, 2022, 26 pages, VMware, Inc.
Non-Published Commonly Owned U.S. Appl. No. 17/976,717, filed Oct. 28, 2022, 37 pages, VMware, Inc.
Non-Published Commonly Owned U.S. Appl. No. 18/083,536, filed Dec. 18, 2022, 27 pages, VMware, Inc.
Non-Published Commonly Owned U.S. Appl. No. 18/088,554, filed Dec. 24, 2022, 34 pages, VMware, Inc.
Non-Published Commonly Owned U.S. Appl. No. 18/088,556, filed Dec. 24, 2022, 27 pages, VMware, Inc.
Non-Published Commonly Owned U.S. Appl. No. 18/102,685, filed Jan. 28, 2023, 124 pages, VMware, Inc.
Non-Published Commonly Owned U.S. Appl. No. 18/102,687, filed Jan. 28, 2023, 172 pages, VMware, Inc.
Non-Published Commonly Owned U.S. Appl. No. 18/102,688, filed Jan. 28, 2023, 49 pages, VMware, Inc.
Non-Published Commonly Owned U.S. Appl. No. 18/102,689, filed Jan. 28, 2023, 46 pages, VMware, Inc.
Non-Published Commonly Owned U.S. Appl. No. 15/803,964, filed Nov. 6, 2017, 15 pages, The Mode Group.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Taleb, Tarik, "D4.1 Mobile Network Cloud Component Design," Mobile Cloud Networking, Nov. 8, 2013, 210 bages, MobileCloud Networking Consortium, retrieved from http://www.mobile-cloud-networking.eu/site/index.php?process=download&id=127&code=89d30565cd2ce087d3f8e95f9ad683066510a61f.
Tootaghaj, Diman Zad, et al., "Homa: An Efficient Topology and Route Management Approach in SD-WAN Overlays," IEEE Infocom 2020—IEEE Conference on Computer Communications, Jul. 6-9, 2020, 10 pages, IEEE, Toronto, ON, Canada.
Valtulina, Luca, "Seamless Distributed Mobility Management (DMM) Solution in Cloud Based LTE Systems," Master Thesis, Nov. 2013, 168 pages, University of Twente, retrieved from http://essay.utwente.nl/64411/1/Luca_Valtulina_MSc_Report_final.pdf.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Zakurdaev, Gieorgi, et al., "Dynamic On-Demand Virtual Extensible LAN Tunnels via Software-Defined Wide Area Networks," 2022 IEEE 12th Annual Computing and Communication Workshop and Conference, Jan. 26-29, 2022, 6 pages, IEEE, Las Vegas, NV, USA.
Author Unknown, "VeloCloud Administration Guide: VMware SD-WAN by VeloCloud 3.3," Month Unknown 2019, 366 pages, VMware, Inc., Palo Alto, CA, USA.
Non-Published Commonly Owned U.S. Appl. No. 18/137,584, filed Apr. 21, 2023, 57 pages, VMware, Inc.
Non-Published Commonly Owned U.S. Appl. No. 18/222,864, filed Jul. 17, 2023, 350 pages, VMware, Inc.
Non-Published Commonly Owned U.S. Appl. No. 18/222,868, filed Jul. 17, 2023, 22 pages, VMware, Inc.
Non-Published Commonly Owned U.S. Appl. No. 18/224,466, filed Jul. 20, 2023, 56 pages, VMware, Inc.
Non-Published Commonly Owned U.S. Appl. No. 18/235,879, filed Aug. 20, 2023, 173 pages, VMware, Inc.

* cited by examiner

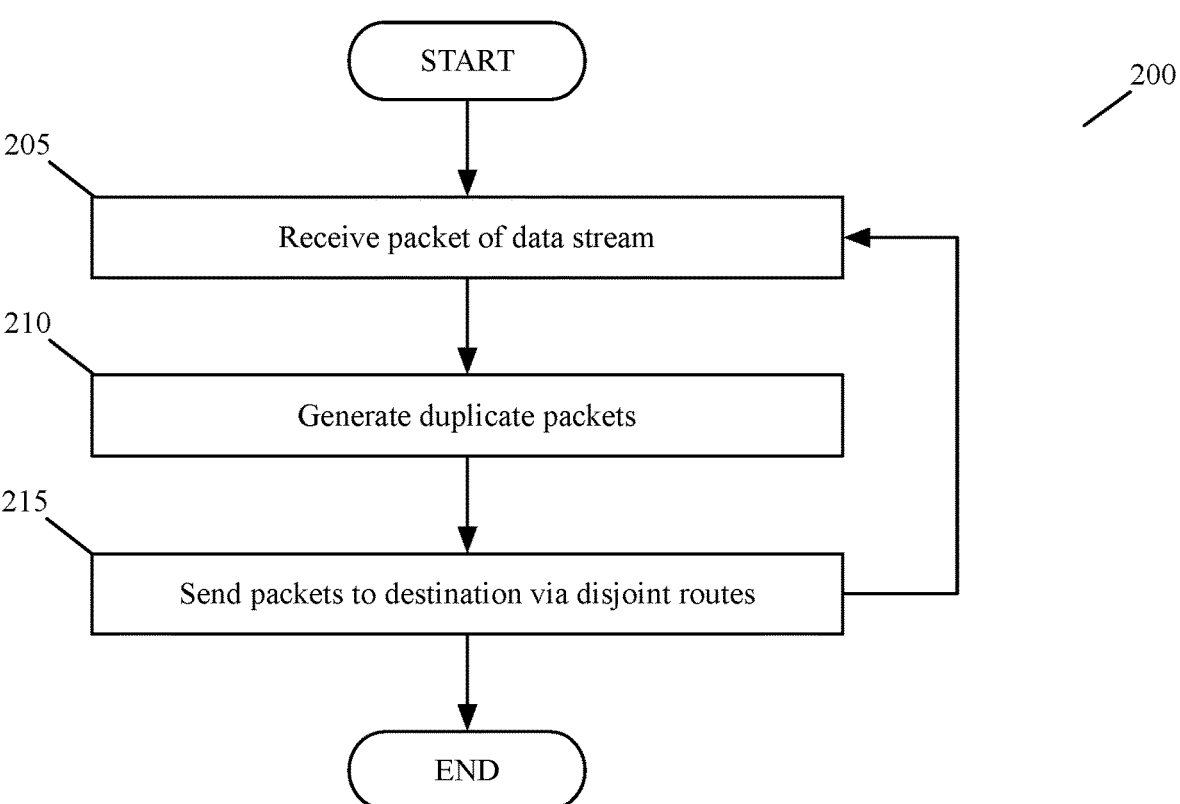
_Figure 2_

Received
Packet
Sequence     600
Numbers

Window
Packet
Sequence
Numbers

Stage 1: Original window
generated for new TCP connection

Stage 2: One packet stored

Stage 3: Three packets stored

Stage 4: Four packets stored

Stage 5: Lowest packets forwarded,
window updated

700

705
Receive data for transmission to destination

710
Generate two sets of packets, each set conforming to MTU of route for that set of packets 715
Send packets to destination via disjoint routes

START

END

Received
Packet
Sequence
Numbers     900

Window
Packet
Sequence
Numbers

Stage 1: Original window
generated for new TCP connection

Stage 2: One packet received and stored

Stage 3: Packet from duplicate data stream received with partially redundant data Stage 4: Non-overlapping data
from each packet stored

EFFICIENT MECHANISM FOR THE TRANSMISSION OF MULTIPATH DUPLICATE PACKETS

Many networks send data streams as a sequence of packets formatted according to the transmission control protocol (TCP)/Internet protocol (IP). An original data message from a source (e.g., an application on a machine of a network) is divided into a sequence of payloads, network source and destination data and metadata is added to each payload to generate a sequence of TCP packets. This metadata includes packet sequence numbers that identify where the data in the payload of each packet lies in the original message. These TCP packets are sent from the source of the data message to a destination of the message (e.g., another machine of the network). The payloads of the received TCP packets are then reassembled into the original message. In the existing art, these TCP packets may arrive at the destination machine out of order or with packets missing. The destination machine must wait for the TCP packets representing earlier parts of the message to arrive, or request that the source machine resend any missing packets.

Some applications such as file transfer, are not sensitive to time delays caused by waiting for late packets and requesting and receiving missing packets. However, other applications, such as real time video or audio communications are sensitive to such time delays. Present network architecture does not provide an efficient way of eliminating this problem of delayed and lost packets. Therefore, there is a need in the art for an efficient way to minimize the effect of delayed and lost packets using multipath duplicate packets.

BRIEF SUMMARY

The method of some embodiments sends duplicate copies of TCP packets along multiple paths from a source network node to a destination network node, stores the first instance of each packet to arrive at the destination network node and discards any subsequent instances of each packet to arrive at the destination network node.

The method, in some embodiments, aggregates duplicate transmission control protocol (TCP) packets of a data stream duplicated and sent over disjoint routing paths. Each duplicate pair of packets includes a packet sequence number unique to that duplicate pair. The method iteratively (1) generates a window of packet sequence numbers for the data stream starting with a lowest packet sequence number, of the data stream, that has not been received, (2) receives a TCP packet sent over one of a first routing path and a second, disjoint routing path. If the packet sequence number of the received TCP packet is outside the window or is a duplicate of a previously received TCP packet, the method drops the received TCP packet. If the packet sequence number of the received TCP packet is within the window and is not a duplicate of a previously received TCP packet, the method stores the received TCP packet.

In some embodiments, the size of the window corresponds to an advertised TCP receive window size for the data stream. The method may further include measuring a latency difference between the first and second routing paths. Measuring the latency difference between the first and second routing paths includes determining a difference between an arrival time of a TCP packet and a corresponding duplicate of the TCP packet, in some embodiments. Measuring the latency difference between the first and second routing paths may include determining a difference between an arrival time of each of multiple TCP packets and corresponding duplicates of the TCP packets.

The method may further include determining whether the TCP packet sequence number of the received TCP packet corresponds to the lowest packet sequence number, of the data stream, that has not been received. If the TCP packet sequence number of the received TCP packet corresponds to the lowest packet sequence number, of the data stream, that has not been received, the method identifies an updated value of the lowest packet sequence number, of the data stream, that has not been received, based at least on the packet sequence number of the received TCP. The updated value of the lowest packet sequence number, of the data stream, that has not been received, may further be based on one or more packet sequence numbers of previously received TCP packets. Storing the received TCP packet includes storing the packet within a data storage of received TCP packets. In some embodiments, the packets are stored in an order defined by the packet sequence numbers of the packets.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

FIG. 2 conceptually illustrates a process of some embodiments for sending duplicate packets along multiple paths.

DETAILED DESCRIPTION

Figure 1:
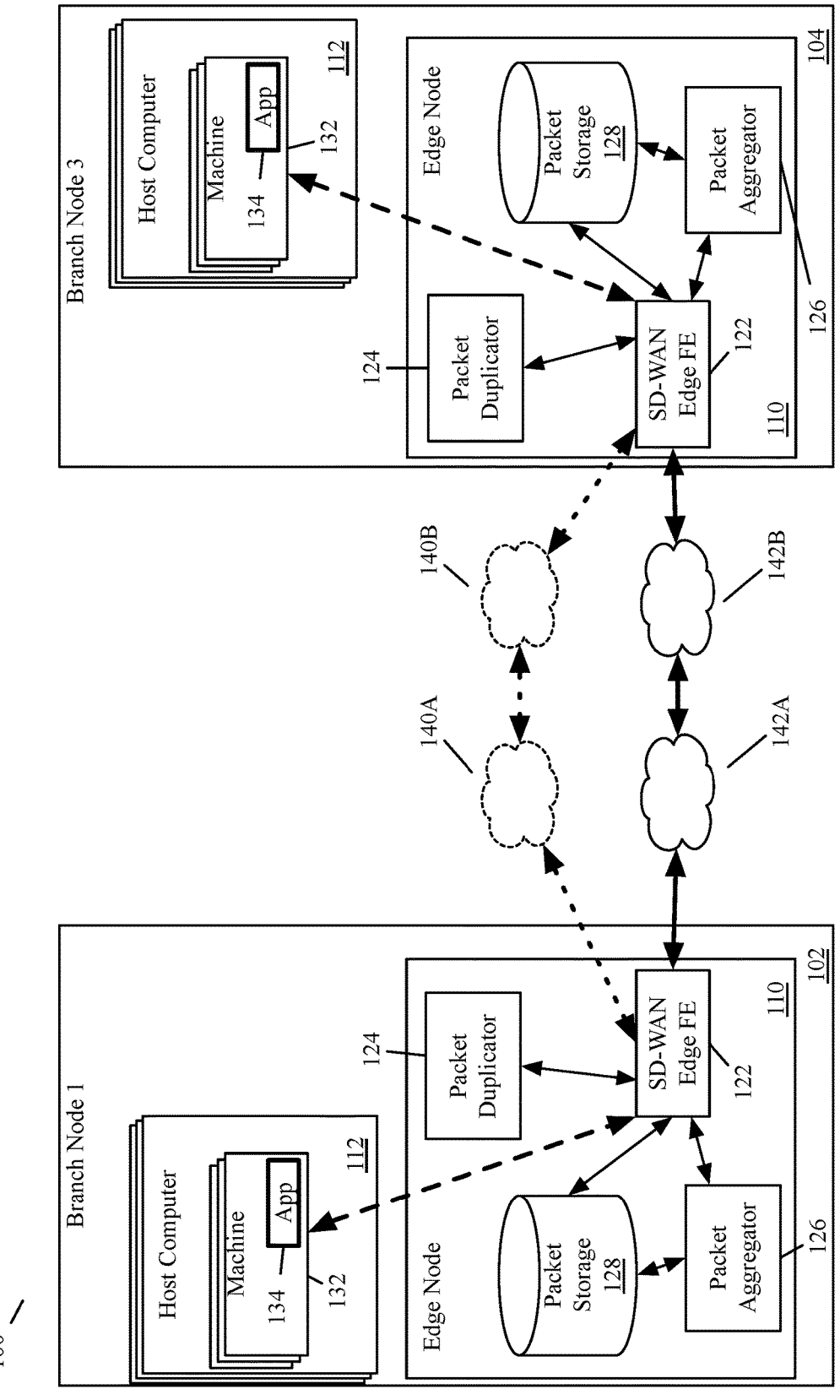
FIG. 1 illustrates an example of a virtual network that is created for a particular entity using SD-WAN forwarding elements (FEs) deployed at branch nodes and datacenters (e.g., implemented on public clouds).

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

The method, in some embodiments, aggregates duplicate transmission control (TCP) packets of a data stream duplicated and sent over disjoint routing paths. Each duplicate pair of packets includes a packet sequence number unique to that duplicate pair. The method iteratively (1) generates a window of packet sequence numbers for the data stream starting with a lowest packet sequence number, of the data stream, that has not been received, (2) receives a TCP packet sent over one of a first routing path and a second, disjoint routing path. If the packet sequence number of the received TCP packet is outside the window or is a duplicate of a previously received TCP packet, the method drops the received TCP packet. If the packet sequence number of the received TCP packet is within the window and is not a duplicate of a previously received TCP packet, the method stores the received TCP packet.

In some embodiments, the size of the window corresponds to an advertised TCP receive window size for the data stream. The method may further include measuring a latency difference between the first and second routing paths. Measuring the latency difference between the first and second routing paths includes determining a difference between an arrival time of a TCP packet and a corresponding duplicate of the TCP packet, in some embodiments. Measuring the latency difference between the first and second routing paths may include determining a difference between an arrival time of each of multiple TCP packets and corresponding duplicates of the TCP packets.

The method may further include determining whether the TCP packet sequence number of the received TCP packet corresponds to the lowest packet sequence number, of the data stream, that has not been received. If the TCP packet sequence number of the received TCP packet corresponds to the lowest packet sequence number, of the data stream, that has not been received, the method identifies an updated value of the lowest packet sequence number, of the data stream, that has not been received, based at least on the packet sequence number of the received TCP. The updated value of the lowest packet sequence number, of the data stream, that has not been received, may further be based on one or more packet sequence numbers of previously received TCP packets. Storing the received TCP packet includes storing the packet within a data storage of received TCP packets. In some embodiments, the packets are stored in an order defined by the packet sequence numbers of the packets.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP/IP packets, TCP segments, UDP datagrams, etc. Also, as used in this document, references to L2, L3, L4, and L7 layers (or layer 2, layer 3, layer 4, layer 7) are references, respectively, to the second data link layer, the third network layer, the fourth transport layer, and the seventh application layer of the OSI (Open System Interconnection) layer model. TCP/IP packets include an addressing tuple (e.g., a 5-tuple specifying a source IP address, source port number, destination IP address, destination port address and protocol). Network traffic refers to a set of data packets sent through a network. For example, network traffic could be sent from an application operating on a machine (e.g., a virtual machine or physical computer) on a branch of an SD-WAN through a hub node of a hub cluster of the SD-WAN. As used herein, the term "data stream" refers to a set of data sent from a particular source (e.g., a machine on a network node) to a particular destination (e.g., a machine on a different network node) and return packets from that destination to the source. One of ordinary skill in the art will understand that the inventions described herein may be applied to packets of a particular data stream going in one direction or to packets going in both directions.

FIG. 1 illustrates an example of a virtual network 100 that is created for a particular entity using SD-WAN forwarding elements (FEs) deployed at branch nodes and datacenters (e.g., implemented on public clouds). Examples of public clouds are public clouds provided by Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc. The hubs and branch nodes described herein may operate as parts of a virtual network. Also, the SD-WAN forwarding elements in some embodiments are software routers executing on host computers, or hardware routers, or a combination of software and hardware routers. However, one of ordinary skill will understand that the methods of various embodiments are also applicable to physical networks and to partially virtual and partially physical networks.

In FIG. 1, the network includes branch nodes 102 and 104 and clouds 140A, 140B, 142A, and 142B. The branch nodes 102 and 104 each include an edge node 110 with an SD-WAN FE 122, a packet duplicator 124, a packet aggregator 126, and a packet storage 128. The branch nodes 102 and 104 each include host computers 112 that execute machines 132 (e.g., virtual machines, containers of a container network, etc.) with applications 134.

The applications 134 may send data packets (not shown) between the branch nodes 102 and 104. The data packets from branch node 102 to branch node 104 can be sent along two different paths, starting with hopes to either cloud 140A or 142A. In the illustrated embodiment, each route passes through two clouds (clouds 140A and 140B or clouds 142A and 142B). However, in some embodiments, either route may pass through more or fewer clouds, including routes that do not pass through any clouds. The data sent through the clouds 140A and 142A may be sent, from the branch node 102, through different physical links (e.g., a telco provider MPLS (multi-protocol label switching) link, commercial Internet link (e.g., cable modem link), 5G wireless link, etc.), or may be send through a common physical link with the routes diverging at that link or later. Similarly data received through clouds 140B and 142B may be received, at the branch node 104, through different physical links or a common physical link. One of ordinary skill in the art will understand that in some embodiments, each of the two paths uses a different virtual private network (VPN) tunnel and in some embodiments one or both of the paths does not include a VPN tunnel.

The two disjoint paths (through links 140 and 142) both send data through the FE 122 of the edge node 122 of branch node 104. Disjoint paths are data paths through multiple routing elements from a source machine to a destination machine, where each path passes through at least one routing element that the other path does not pass through (i.e., at least one mutually exclusive routing element). In some embodiments, disjoint paths pass through multiple mutually exclusive routing elements. One of ordinary skill in the art will understand that the physical and/or virtual routes that the data packets of each path may be more complicated than those shown in FIG. 1. For example, the paths may pass through multiple (not shown) physical and/or virtual forwarding elements (e.g., routers, NATs, etc.) between nodes 102 and 104. Furthermore, although the illustrated embodiment shows two paths between nodes 102 and 104, in some embodiments, more than two paths are available. In some embodiments with more than two paths, the method may generate more than two duplicates of the packets and send the duplicates through more than two paths.

Figure 3:
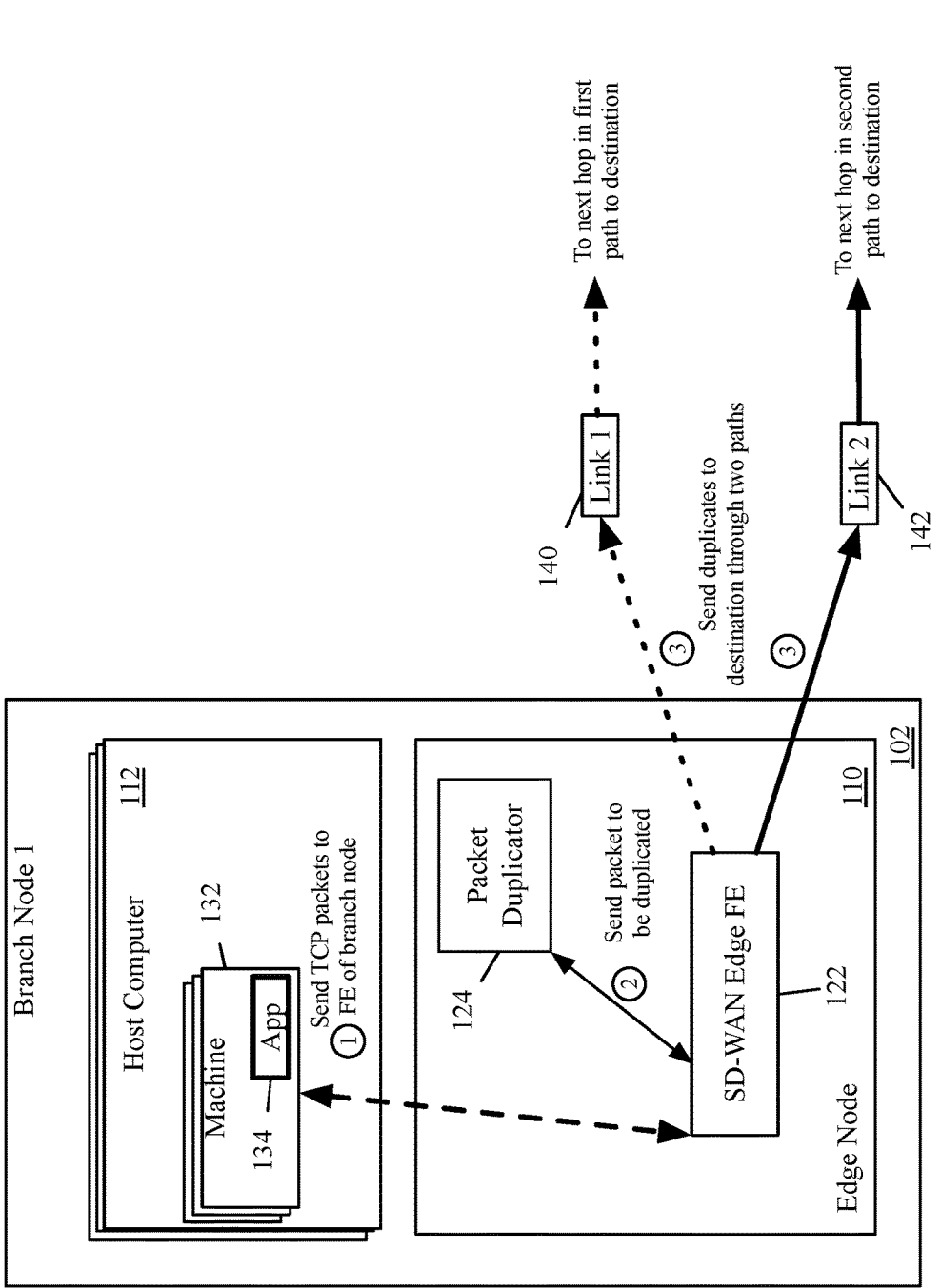
FIG. 3 illustrates a branch node with components for generating, duplicating, and sending out TCP packets of a data stream.

FIG. 2 conceptually illustrates a process 200 of some embodiments for sending duplicate packets along multiple paths. The process 200 will be described with reference to FIG. 3. FIG. 3 illustrates a branch node 102 with components for generating, duplicating, and sending out TCP packets of a data stream. The process 200 first receives (at 205) packets of a data stream. In FIG. 3, these TCP packets are shown to be originally sent from an application 134 operating on a machine 132 executed by host computer 112 in step 1. However, one of ordinary skill in the art will understand that the source of the packets could be an application, operating system, etc. operating directly on a computer of the branch node or in some embodiments, from a different branch node. In some embodiments, the first packet of the received data stream is a synchronization (SYN) packet generated by the source machine to initiate a TCP connection with the destination machine.

The process 200 then generates (at 210) duplicate packets. In FIG. 3, these TCP packets are shown to be sent from the FE 122 to be duplicated by a packet duplicator 124 of the edge node 110 in step 2. Although in the illustrated example, the packet duplicator 124 is shown as a separate component (e.g., software component) of the edge node 110, in some embodiments, the packets are duplicated by the FE 122 itself (e.g., by sending copies of the packets out through multiple routing paths). One of ordinary skill in the art will understand that in some embodiments, two duplicates of the packets are generated while in other embodiments more than two duplicates are generated.

The process 200 then sends the packets toward the destination (e.g., to the destination IP address) of the packets along multiple disjoint routing paths. In FIG. 3, these TCP packets are shown to be sent from the FE 122 to links 140 and 142 in step 3. However, one of ordinary skill in the art will understand that in some embodiments, duplicates are sent over more than two paths. One of ordinary skill in the art will also understand that although FIG. 3 does not include a packet aggregator for aggregating duplicated return packets, in some embodiments, the method is applied in both directions and therefore the edge node 110 of a source branch node 102 would include a packet aggregator (or perform aggregation with another component) as well as the packet duplicator 124 (or performing duplication with another component).

Figure 4:
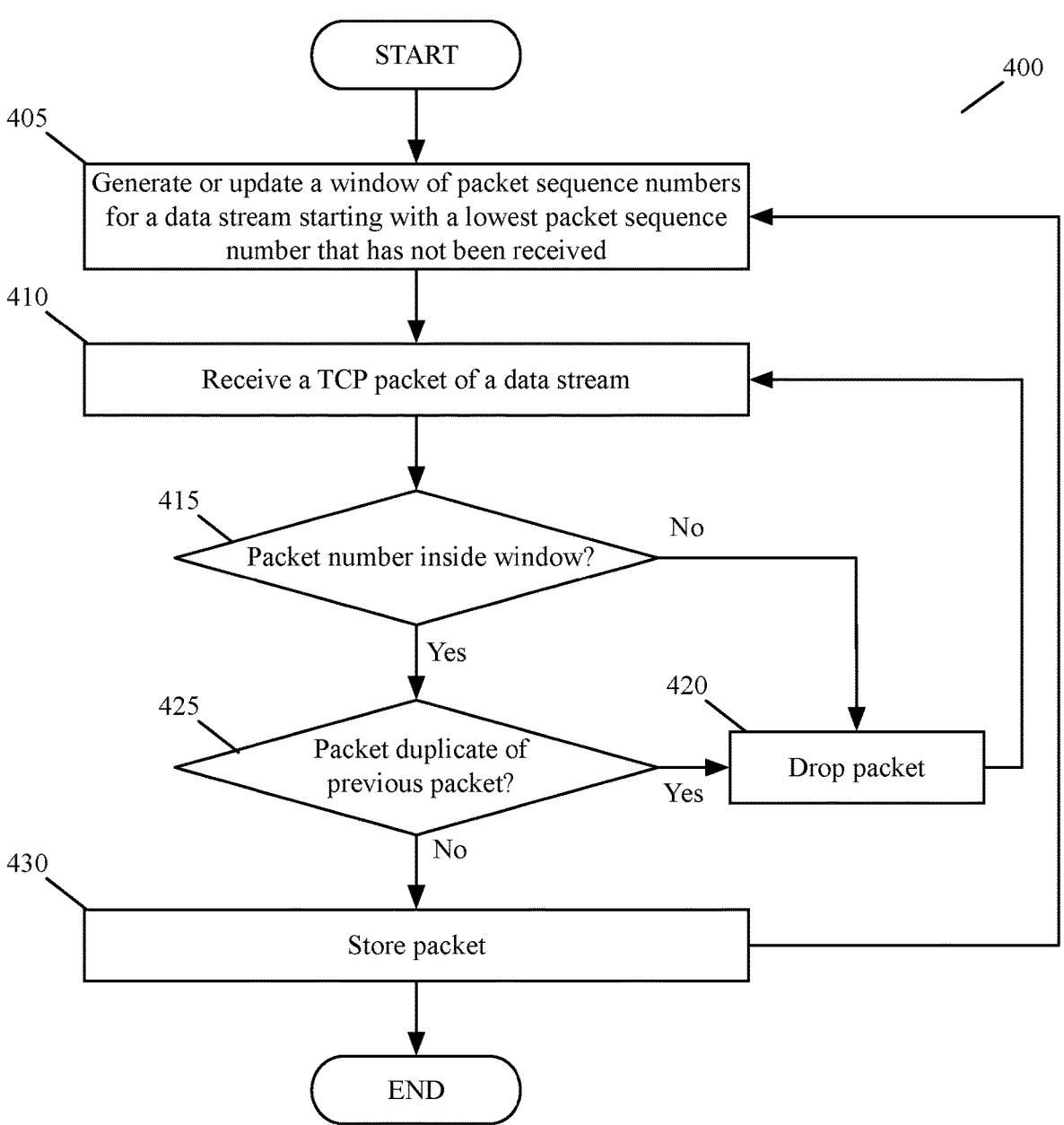
FIG. 4 conceptually illustrates a process for aggregating duplicate packets received through multiple routing paths.

FIG. 4 conceptually illustrates a process 400 for aggregating duplicate packets received through multiple routing paths. FIG. 4 will be described with reference to FIG. 5. FIG.

5 illustrates a branch node 104 with components for receiving and aggregating TCP packets of a data stream. The process 400 starts by generating (at 405) a window of packet sequence numbers for a data stream starting with a lowest packet sequence number that has not been received. In some embodiments, generating the window comprises creating a list of TCP packet fragments (e.g., payloads or headers of a TCP packets separated from each other). The method of such embodiments may generate a payload fragment from a TCP packet based on the packet sequence number, the payload size of the packet, and a pointer to a memory location containing a stored copy of the TCP payload fragment. One of ordinary skill will understand that this payload fragment data would enable the method to determine the packet sequence number of a missing TCP packet based on the payload fragment data of the immediately preceding packet. That is, immediately preceding with respect to an original data message broken down into the TCP packets of a data stream. In some embodiments, a TCP header fragment may contain additional metadata, of the TCP packet.

Figure 5:
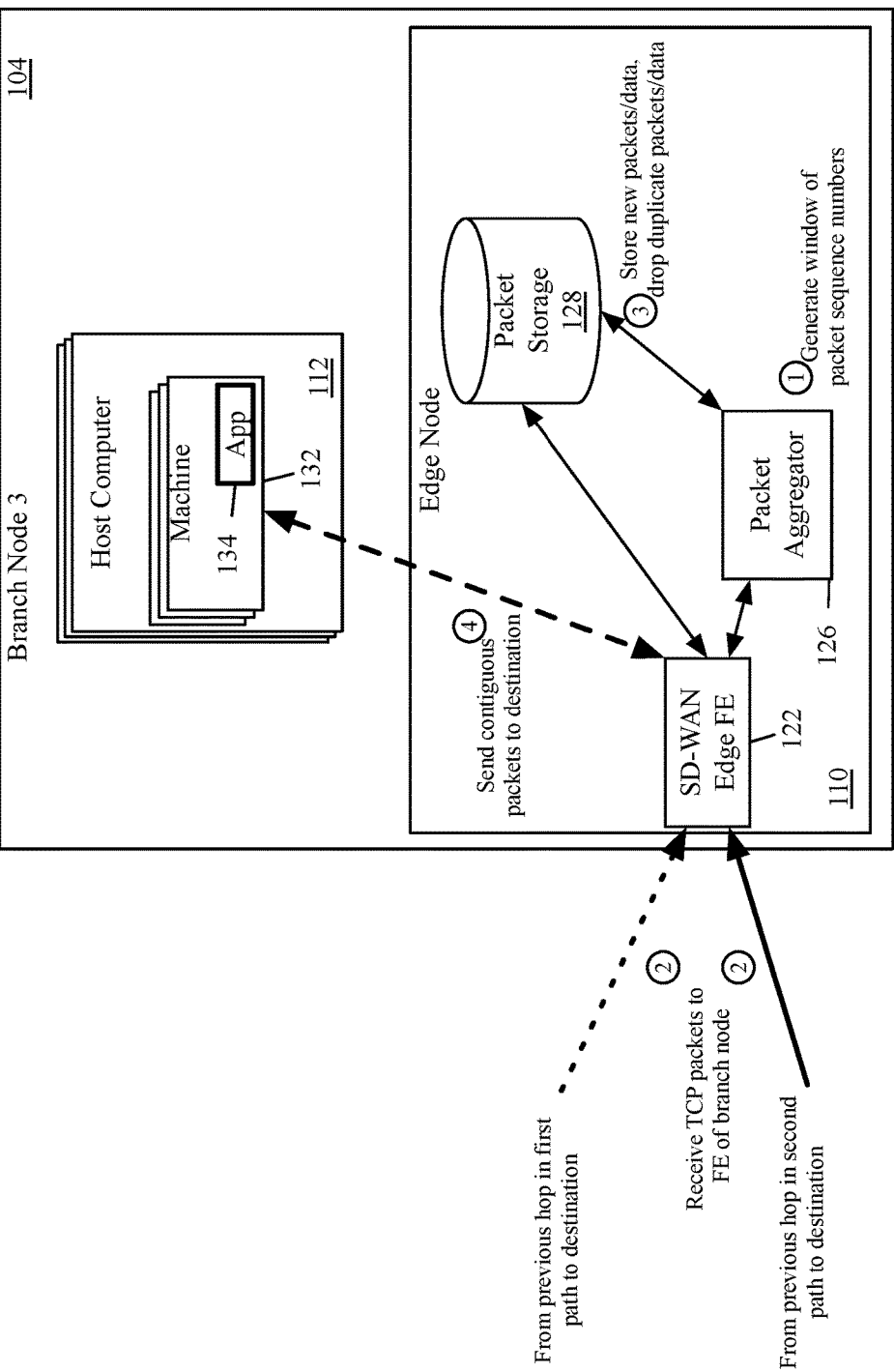
FIG. 5 illustrates a branch node with components for receiving and aggregating TCP packets of a data stream.

As shown in FIG. 5, in some embodiments, the window is generated by a packet aggregator 126 as step 1. In some embodiments, the window is generated in response to a SYN packet received from a source machine to initiate a TCP connection. One of ordinary skill in the art will understand that the "window" is a conceptual window and in some embodiments is generated by identifying a range of packet sequence numbers starting with the lowest packet sequence number of expected TCP packets and with a size equal to that of a current TCP receive window that has been advertised to the source of the data stream. One of ordinary skill in the art will understand that a TCP receive window is a buffer for data coming in over a TCP connection. The TCP receive window size is the amount of receive data (in bytes) that can be stored in the buffer. This size is advertised to the machine sending the TCP packets. The machine sending the TCP packets will then send only the advertised amount of data before waiting for an acknowledgment from the receiving host. Further details about the window and TCP packet numbers are described below with respect to FIG. 6, below.

The process 400 then receives (at 410) a TCP packet of the data stream. In FIG. 5, this is shown as step 2, performed by the FE 122. In FIG. 5, these TCP packets are shown to be received by the FE 122 from two paths in step 2. However, one of ordinary skill in the art will understand that in some embodiments, duplicates are sent over more than two paths. One of ordinary skill in the art will also understand that although FIG. 5 does not include a packet duplicator for duplicating packets, in some embodiments, the method is applied in both directions and therefore the edge node 110 of a source branch node 104 would include a packet duplicator (or perform duplication with another component) as well as the packet aggregator 126 (or performing aggregation with another component).

The process 400 determines (at 415) whether the packet sequence number of the TCP packet is within the generated window. If the packet sequence number of the TCP packet is outside the generated window, then the process 400 drops (at 420) the packet and returns to operation 410 to receive another TCP packet. Since the range of the window starts at the lowest packet sequence number that hasn't been received, any packets with a packet sequence number less than the starting packet sequence number of the window are necessarily duplicates of packets that have already been received. In other words, the determination of whether a packet is within the window acts as threshold question which sometimes eliminates the need to do a more computationally expensive search of the previously received packets within the range of the window.

If the packet sequence number of the TCP packet is within the generated window, then the process 400 determines (at 425) whether the packet is a duplicate of a previously received packet. In some embodiments, this determination is made by comparing the packet sequence number of the received packets to the packet sequence numbers of the previously received packets in the window. If the packet is a duplicate of a previously received packet, then the received packet is dropped (at 420) and the process 400 returns to operation 410 to receive another TCP packet.

If the packet is not a duplicate of a previously received packet, then the received packet is stored (at 430). In some embodiments, storing or dropping received packet is performed by a packet storage (e.g., packet storage 128 of FIG. 5) as directed by a packet aggregator (e.g., packet aggregator 126). In FIG. 5, the storage or dropping of packets is shown as step 3. In some embodiments, the functions of the packet aggregator are performed by the FE 122 itself rather than by a separate software component. The process 400 then returns to operation 405 to generate a new window if necessary. In some embodiments, the process 400 generates a new window when the received TCP packet has the same packet sequence number as the start of the old window. That is, the new TCP packet includes data at the "bottom" of the old window. The start of the new window in some embodiments is the new lowest packet sequence number that has not been received. In some embodiments, when a new window is generated (at 405), any packets with packet sequence numbers between the starting number of the old window and the starting number of the new window are then forwarded to the machine 132 that is the destination of the data stream. This forwarding is shown in FIG. 5 as step 4.

In some embodiments, TCP packets with packet numbers above the maximum packet sequence number of the window are dropped to conserve storage space. In some embodiments, when neither duplicate of the lowest packet of a window has been received in a threshold time, the method sends a request that the packet be resent. In some embodiments, such resend requests may be sent for packets previously dropped because their packet sequence number was greater than the maximum packet sequence number of the window. In some embodiments, the method collects timing statistics for the disjointed paths based on the differences in arrival times of one or more packets and their corresponding duplicates. For example, the method may measure the latency difference in milliseconds between the paths used. Collected stats, in some embodiments, can be used by the controller to make better decisions of which of multiple available paths to use based on actual TCP Flow stats (latency, jitter, loss, etc.). In some embodiments, the stored TCP packets are stored in an order defined by the packet sequence numbers of the TCP packets.

Figure 6:
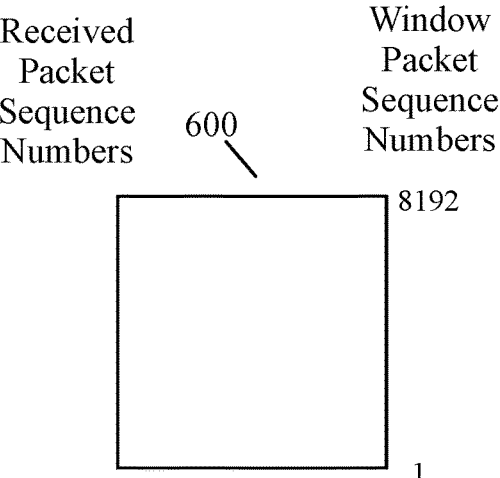
FIG. 6 illustrates a data window and updated window in multiple stages of operation.
Figure 6:
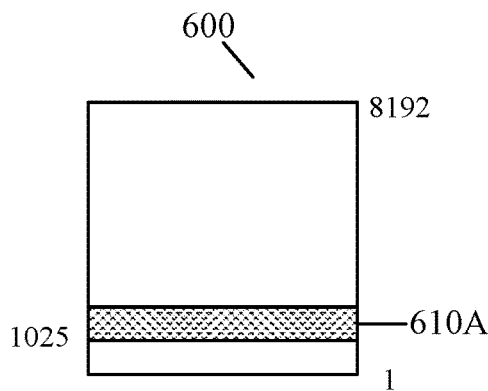
Figure 6:
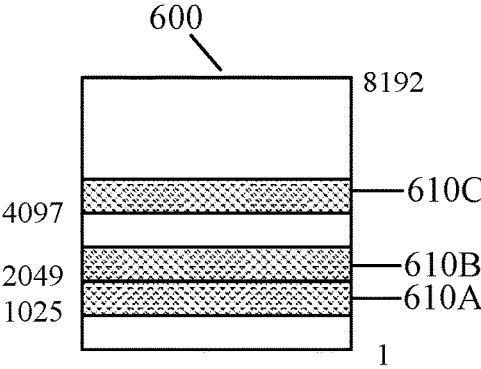
Figure 6:
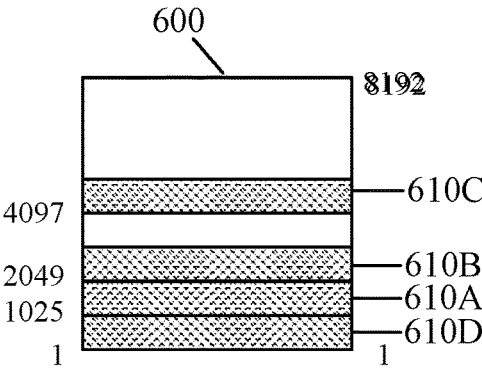
Figure 6:
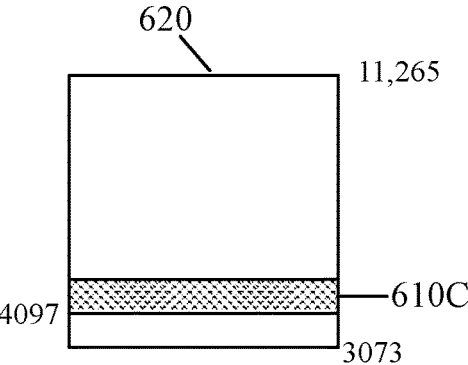

FIG. 6 illustrates a data window 600 and updated window 620 in multiple stages of operation. In some embodiments, the source machine generates a random number (e.g., a random 32-bit number) as the initial sequence number (ISN) for a TCP connection. The source machine sends this number ISN in a SYN packet to the destination. In some embodiments, the first generated TCP packet with a payload is identified with a packet sequence number ISN+1, the packet sequence number of the second generated TCP packet is ISN+1+P, where P is the size in bytes of the payload of the first TCP packet, and so on. In FIG. 6, the ISN is assumed to be zero (0) and the payload of each TCP packet in the illustrated example is 1024 bytes. For convenience, the data offsets from the first byte of the data being sent in the data flow are referred to herein as "packet sequence numbers" even though some of the numbers shown are not sequence numbers of a received packet. One of ordinary skill in the art will understand that in some embodiments, the size of payloads of TCP packets vary. Each stored TCP packet is conceptually represented, in FIG. 6, by packet identifiers 610A-610D. The conceptual packet identifiers 610A-610D may correlate with actual stored data in a machine which includes the packet sequence number, the payload size, and a pointer to a stored copy of the packets that the identifier represents in some embodiments.

Stage 1, illustrates an original window 600 generated for a new TCP connection. In some embodiments, the original window is generated as a response to an FE of a destination branch node receiving a SYN packet sent over a network from a source machine. Window 600 starts at 1 and has a size of 8192, which is the size of the TCP receive window in this stage. In stage 1, no TCP packets with a payload have been received. In stage 2, one TCP packet has been received with a packet sequence number of 1025. As the starting packet sequence number of the window 600 is 1, which is less than 1025, and the other (duplicate) TCP packet with a packet sequence number of 1025 has not been received, the received packet is stored, which is represented by packet identifier 610A. In some embodiments, a list of received packet sequence number ranges is maintained to facilitate checking for duplicate packets when a TCP packet with a sequence number within the window is received.

In stage 3, two more TCP packets with packet sequence numbers 2049 and 4097 have been received, as represented by packet identifiers 610B and 610C, respectively. In stage 4, the TCP packet corresponding to the lowest packet sequence number of the window is received, identified as not duplicated, and stored, as represented by packet identifier 610D. A contiguous set of TCP packets (represented by packet identifiers 610D, 610A, and 610B) with the lowest TCP packet number value of the set (with a value of 1) corresponding to the starting packet sequence number of the window (also with a value of 1) has been received. As a result, in stage 5, the three stored TCP packets in the contiguous set have been forwarded to the destination machine (e.g., by an FE such as FE 122 of branch node 104 of FIG. 1) and the window 600, of FIG. 6, has been updated to window 620. Window 620 starts at packet sequence number 3073 as that is the lowest packet sequence number that has not been received by stage 5. In stage 5, the receive window for the TCP connection is still 8192, therefore the top of the window 620 is 8192 above the starting packet sequence number of the window 620, and has a packet sequence number 11,265. The TCP packet with a packet sequence number of 4097 remains in storage (e.g., stored in packet storage 128 of branch node 104 of FIG. 1) because not all lower numbered TCP packets have been received.

The above described embodiments sent duplicates of individual packets. Each duplicated packet sent along route includes exactly the same portion of the original data as a corresponding packet sent along another route, in those embodiments. However, in other embodiments, the original data is sent as two separate sets of data packets along two different routes with each set of data packet having the original data divided up in a different manner. For example, in some embodiments, one set of packets may be sent along a route with a maximum transmission unit (MTU) of 1500 bytes, while the other set of packets may be sent along a route with an MTU of 9000 bytes. In such a case, some embodiments would divide the original data into payloads appropriate to the MTU of the paths along which the packets would be sent.

Figure 7:
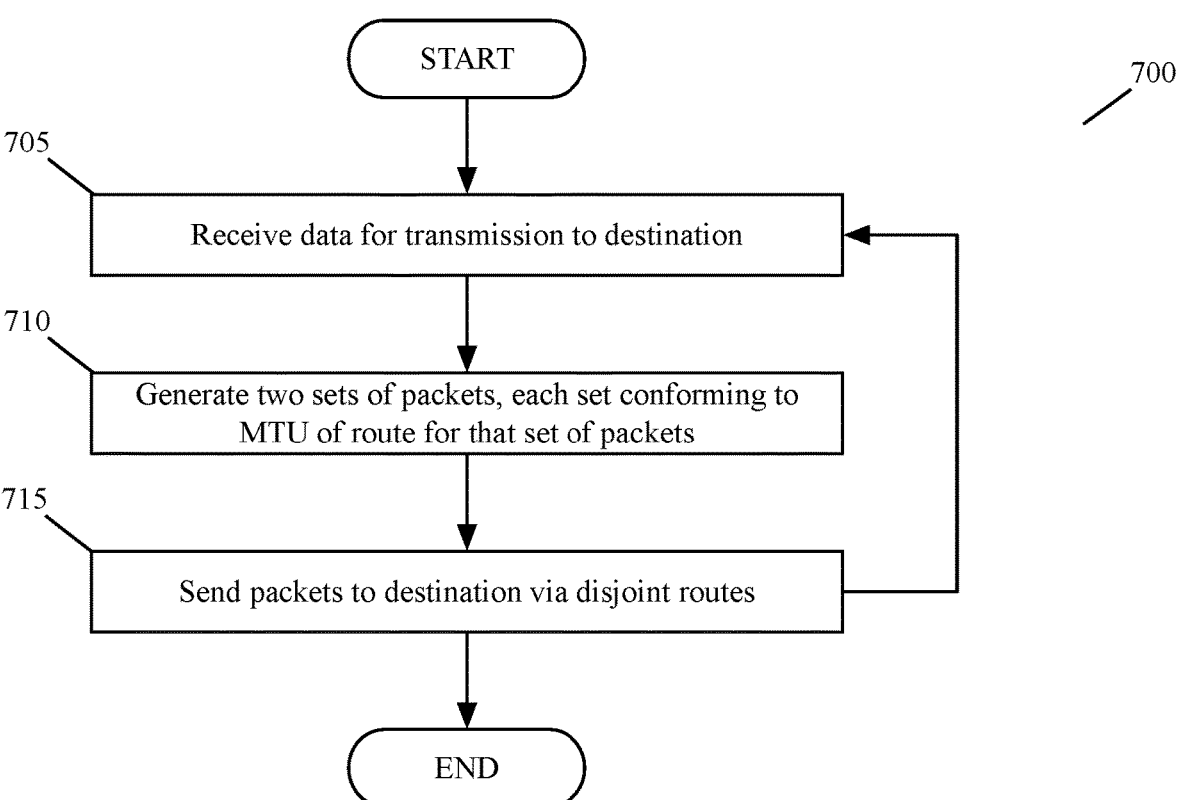
FIG. 7 conceptually illustrates a process of some embodiments for sending duplicate data in two sets of packets, with each set having different sized packets.

FIG. 7 conceptually illustrates a process 700 of some embodiments for sending duplicate data in two sets of packets, with each set having different sized packets. The process 700 starts by receiving (at 705) the original data for transmission. In different embodiments, this data may be received in different ways. In some embodiments, the data is received at an FE as an original set of packets (e.g., TCP packets) from a machine (e.g., a virtual machine such as machine 132 in FIG. 1). In other embodiments, the data is received at as a stream of data in some other format to be divided into packets by an FE.

The process 700 then generates (at 710) two sets of packets, each set conforming to the MTU of the route for that set of packets. As mentioned above, the packet sequence number of a particular packet in a set of TCP packets represent an ISN that is fixed for the set of TCP packets, plus an offset from the start of the data in that packet set to the start of the data in that packet sequence. In some embodiments, the new packet set containing the same aggregate data, but with different packet sizes, uses the same ISN value in order to simplify synchronization of the data. In other embodiments, the packet sets use different ISN values, but the receiver compensates for the different ISN values when synchronizing the data.

The process 700 then sends (at 715) each set of packets to the destination along different routes. In some embodiments in which the data is received at the FE as a set of original packets, the FE forwards the original packets along one route while generating a different set of packets, containing the same aggregate data, but with the data divided differently (e.g., to accommodate a different MTU of the second route), along the second route. In some embodiments, the second set of packets is generated by a packet duplicator such as packet duplicator 124 of FIG. 1. In such embodiments, the packet duplicator 124 would be duplicating the data from the original packets while generating new packets for the data rather than duplicating the individual packets. That is, the packet duplicator would generate a new set of packets with a size based on the MTU of the intended route. Packets of a different size from the original packets would have packet sequence numbers corresponding to the new arrangement of the data in the packets.

Figure 8:
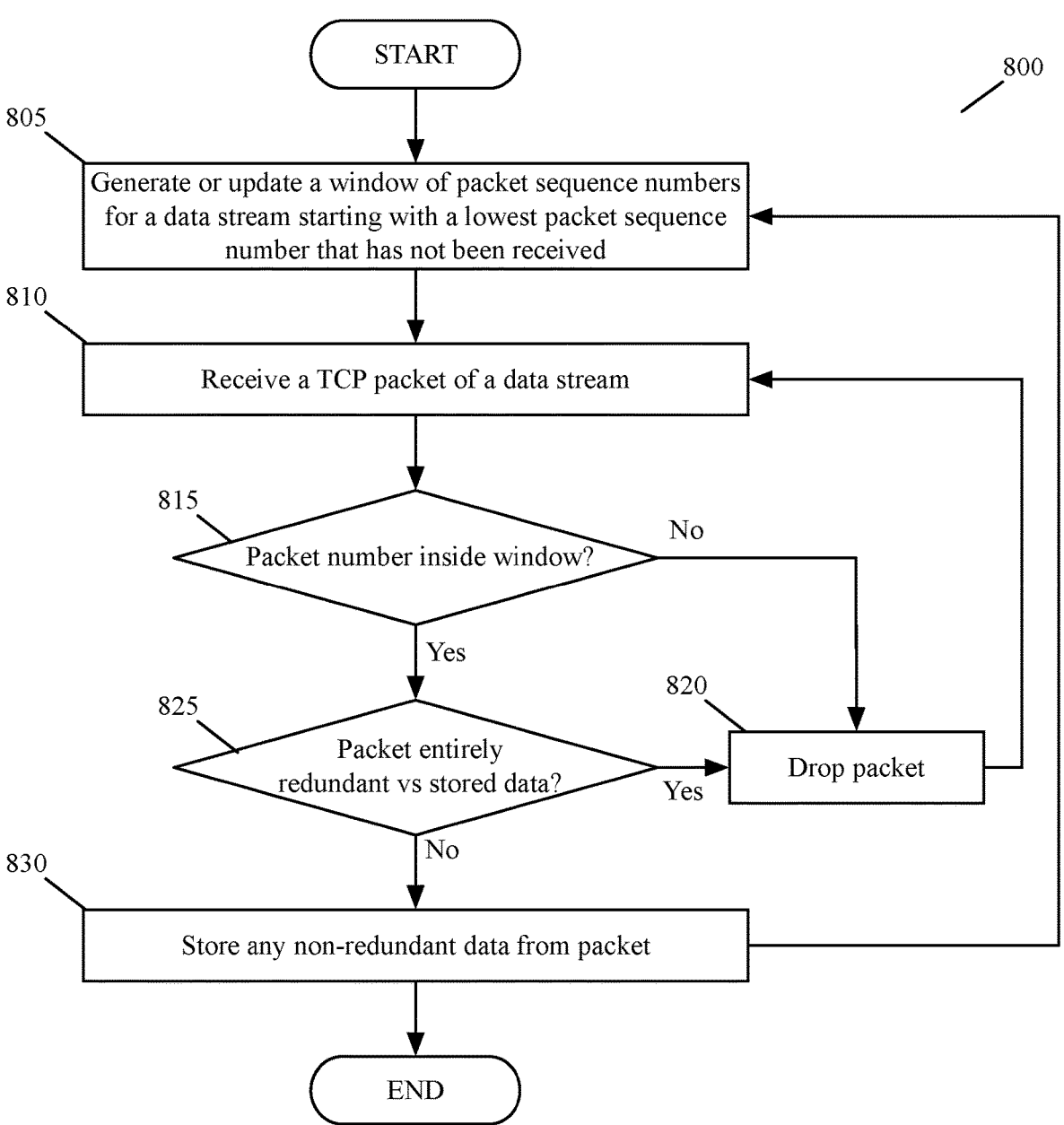
FIG. 8 conceptually illustrates a process for aggregating data from packet sets, containing the same aggregate data, received through multiple routing paths.

FIG. 8 conceptually illustrates a process 800 for aggregating data from packet sets, containing the same aggregate data, received through multiple routing paths. The process 800 is similar to the process 400 of FIG. 4, with changes from operations 415-430 to the corresponding operations 815-830 of FIG. 8. FIG. 8 will also be described with reference to FIG. 5, with the differences in the operations of packet aggregator 126 and packet storage 128, from operations of the same elements when implementing the process 400 of FIG. 4, identified. FIG. 5 illustrates a branch node 104 with components for receiving and aggregating data from packets of a data stream. The process 800 starts by generating (at 805) a window of packet sequence numbers for a data stream starting with a lowest packet sequence number of data that has not been received.

As mentioned above with respect to FIG. 7, in some embodiments, each packet set uses the same ISN to simplify synchronization of the received data. In other embodiments, the packet aggregator (e.g., packet aggregator 126 in FIG. 5) compensates for different ISN values in the different packet streams. However, one of ordinary skill in the art will understand that the offset values from the ISNs that each packet uses will correspond. Thus, for example, a TCP packet from a first packet stream that has 1000 bytes and a packet sequence number with an offset of 1000 (from the ISN of that packet set) will include the same data in its payload as two packets with 500 bytes each and offsets of 1000 and 1500 respectively (from the ISN of that packet set) have in their payloads. Accordingly, a packet aggregator (e.g., packet aggregator 126 in FIG. 5) of some embodiments is able to correlate payload data from separate packet sets.

As shown in FIG. 5, in some embodiments, the window is generated by a packet aggregator 126 as step 1. In some embodiments, the window is generated in response to a SYN packet received from a source machine to initiate a TCP connection. One of ordinary skill in the art will understand that the "window" is a conceptual window and in some embodiments is generated by identifying a range of packet sequence numbers starting with the lowest packet sequence number of expected TCP packets and with a size equal to that of a current TCP receive window that has been advertised to the source of the data stream.

The process 800 then receives (at 810) a TCP packet of the data stream. In FIG. 5, this is shown as step 2, performed by the FE 122. In FIG. 5, these TCP packets are shown to be received by the FE 122 from two paths in step 2. However, one of ordinary skill in the art will understand that in some embodiments, duplicates are sent over more than two paths. One of ordinary skill in the art will also understand that although FIG. 5 does not include a packet duplicator for duplicating packets, in some embodiments, the method is applied in both directions and therefore the edge node 110 of a source branch node 104 would include a packet duplicator (or perform duplication with another component) as well as the packet aggregator 126 (or performing aggregation with another component).

The process 800 determines (at 815) whether the packet sequence number of the TCP packet is within the generated window. If the packet sequence number of the TCP packet is outside the generated window, then the process 800 drops (at 820) the packet and returns to operation 810 to receive another TCP packet. Since the range of the window starts at the lowest packet sequence number that hasn't been received, any packets with a packet sequence number less than the starting packet sequence number of the window are necessarily duplicates of packets that have already been received. In other words, the determination of whether a packet is within the window acts as threshold question which sometimes eliminates the need to do a more computationally expensive search of the previously received packets within the range of the window.

If the packet sequence number of the TCP packet is within the generated window, then the process 800 determines (at 825) whether the packet data is entirely redundant (i.e., duplicated by previously received data). In some embodiments, this determination is made by comparing the packet sequence number of the received packet and the size of the received packet's data payload to the packet sequence numbers corresponding to the missing data. In other embodiments, this determination is made by comparing the packet sequence number of the received packets and the size of the received packet's data payload to the packet sequence numbers corresponding to the received data. If the packet's data payload is entirely duplicative of previously received data, then the received packet is dropped (at 820) and the process 800 returns to operation 810 to receive another TCP packet (of either set of packets).

If the packet data is not entirely duplicative of previously received data, then any non-redundant data from the received packet is stored (at 830). In some embodiments, storing or dropping received packet payload data is performed by a packet storage (e.g., packet storage 128 of FIG. 5) as directed by a packet aggregator (e.g., packet aggregator 126). In FIG. 5, the storage or dropping of packet data is shown as step 3. In some embodiments, the functions of the packet aggregator are performed by the FE 122 itself rather than by a separate software component.

The process 800 then returns to operation 805 to generate a new window if necessary. In some embodiments, the process 800 generates a new window when the received TCP packet has the same packet sequence number (or packet number offset from the ISN of that packet set) as the start of the old window. That is, when the new TCP packet includes data at the "bottom" of the old window. The start of the new window in some embodiments is the new lowest packet sequence number of data that has not been received. In some embodiments, when a new window is generated (at 805), any packets with packet sequence numbers between the starting number of the old window and the starting number of the new window are then forwarded to the machine 132 that is the destination of the data stream. This forwarding is again shown in FIG. 5 as step 4.

Figure 9:
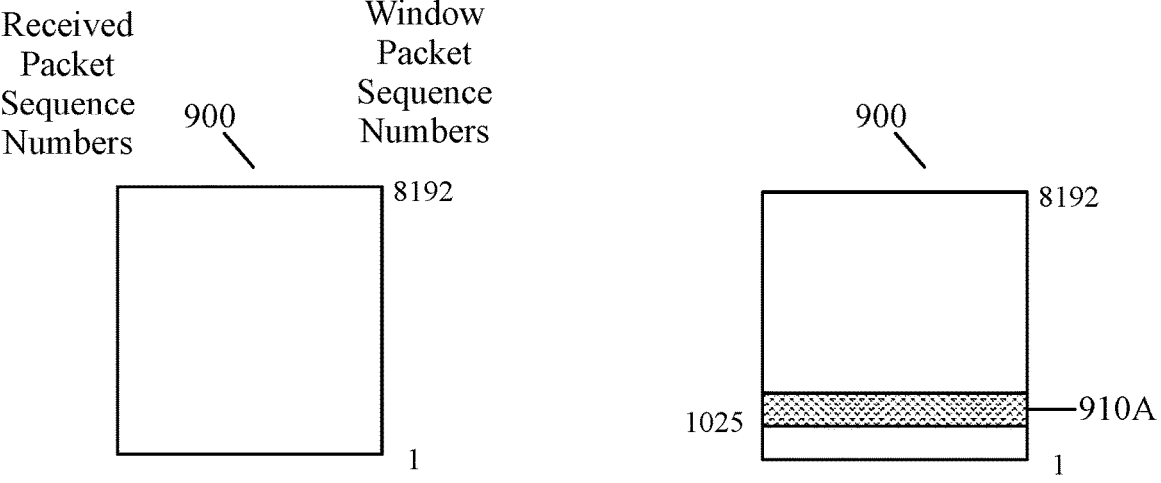
FIG. 9 illustrates a data window in a duplicate data system with partially redundant data packets in multiple stages of operation.
Figure 9:
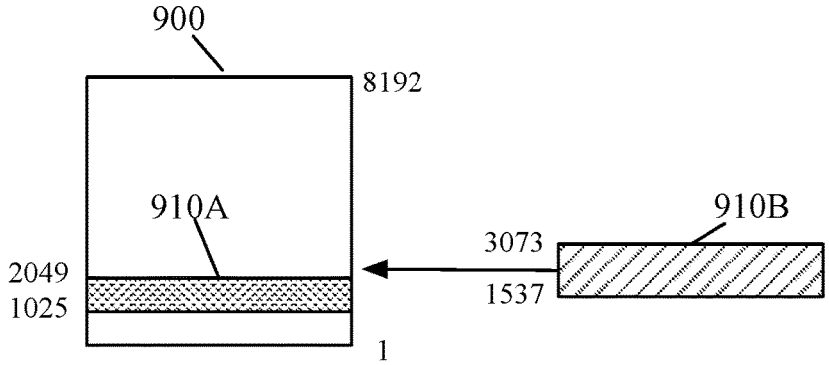
Figure 9:
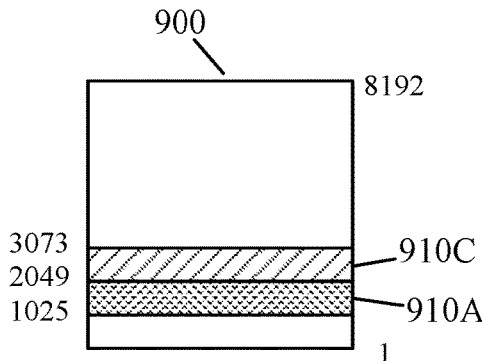

FIG. 9 illustrates a data window 900 in a duplicate data system with partially redundant data packets in multiple stages of operation. In some embodiments, the source machine generates a random number (e.g., a random 32-bit number) as the initial sequence number (ISN) for a TCP connection. The source machine sends this number ISN in a SYN packet to the destination. In some embodiments, the first generated TCP packet with a payload is identified with a packet sequence number ISN+1, the packet sequence number of the second generated TCP packet is ISN+1+P, where P is the size in bytes of the payload of the first TCP packet, and so on. In embodiments with two sets of TCP packets, the ISNs for each set may be different, with the windows based on the packet sequence numbers of one TCP set or based on the offset. One of ordinary skill in the art will understand how to compensate for different ISNs and how to generate a second packet set with the same ISN as the original packet set.

In FIG. 9, the ISN (for both sets of packets) is assumed to be zero (0), the data payload of each TCP packet in the first packet set in the illustrated example is 1024 bytes, the data payload of each TCP packet in the second packet set in the illustrated example is 1536 bytes. Therefore, three packets of the first packet set carry data corresponding to two packets of the second packet set. One of ordinary skill in the art will understand that in some embodiments, the sizes of payloads of TCP packets are different in other examples and in other embodiments. Each received or stored set of data is conceptually represented, in FIG. 9, by data range identifiers 910A-910C. The conceptual data range identifiers 910A-910C may correlate with actual stored data in a machine which includes the packet sequence number, the payload size, and a pointer to a stored copy of the packets that the identifier represents in some embodiments.

Stage 1, illustrates an original window 900 generated for a new TCP connection. In some embodiments, the original window is generated as a response to an FE of a destination branch node receiving a SYN packet sent over a network from a source machine. Window 900 starts at 1 and has a size of 8192, which is the size of the TCP receive window in this stage. In stage 1, no TCP packets with a payload have been received. In stage 2, one TCP packet has been received with a packet sequence number of 1025 and a payload size of 1024. As the starting packet sequence number of the window 900 is 1, which is less than 1025, and no data corresponding to packet sequence numbers 1025-2049 has been received, the entire received packet is stored, which is represented by data range identifier 910A.

In stage 3, another TCP packet is received, conceptually illustrated as data range identifier 910B, with packet sequence number 1537 and payload size 1536. As shown, the data represented by data range identifier 910B partially overlaps with the previously received data represented by data range identifier 910A. Specifically, data corresponding to packet sequence numbers 1537-2048 has already been received as part of the initially received TCP packet in stage 2. However, the new TCP packet, with a payload represented by data range identifier 910B includes data from packet sequence number 2049-3073 that is not redundant with the previously received data. Accordingly, in stage 4, the non-redundant data (represented by data range identifier 910C) from the TCP packet payload represented by data range identifier 910B is stored while the redundant data is discarded.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
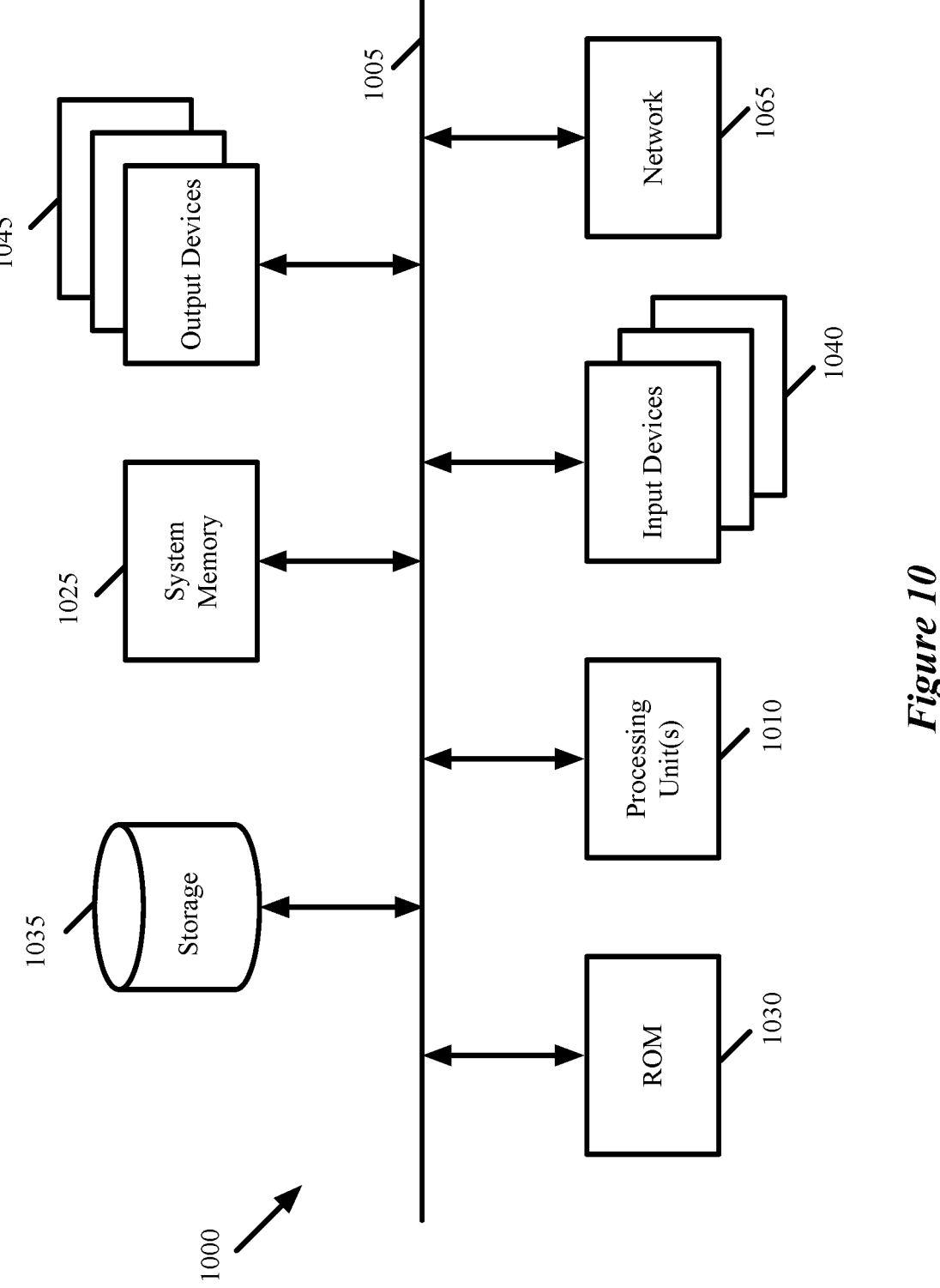
FIG. 10 conceptually illustrates a computer system with which some embodiments of the invention are implemented.

FIG. 10 conceptually illustrates a computer system 1000 with which some embodiments of the invention are implemented. The computer system 1000 can be used to implement any of the above-described hosts, controllers, gateway and edge forwarding elements. As such, it can be used to execute any of the above-described processes. This computer system 1000 includes various types of non-transitory machine-readable media and interfaces for various other types of machine-readable media. Computer system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the computer system. The permanent storage device 1035, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device 1035. Like the permanent storage device 1035, the system memory 1025 is a read-and-write memory device. However, unlike storage device 1035, the system memory 1025 is a volatile read-and-write memory, such as random access memory. The system memory 1025 stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices 1040 enable the user to communicate information and select commands to the computer system 1000. The input devices 1040 include alphanumeric keyboards and pointing devices (also called "cursor control devices"). The output devices 1045 display images generated by the computer system 1000. The output devices 1045 include printers and display devices, such as cathode ray tubes (CRT) or liquid crystal displays (LCD). Some embodiments include devices such as touchscreens that function as both input and output devices 1040 and 1045.

Finally, as shown in FIG. 10, bus 1005 also couples computer system 1000 to a network 1065 through a network adapter (not shown). In this manner, the computer 1000 can be a part of a network of computers (such as a local area network ("LAN"), a wide area network ("WAN"), or an Intranet), or a network of networks (such as the Internet). Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessors or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several of the above-described embodiments deploy gateways in public cloud datacenters. However, in other embodiments, the gateways are deployed in a third-party's private cloud datacenters (e.g., datacenters that the third-party uses to deploy cloud gateways for different entities in order to deploy virtual networks for these entities). Thus, one of ordinary skill in the art would understand that the invention is not to be limited by the foregoing illustrative details, but rather is to be defined by the appended claims.

The invention claimed is:

1. A method of aggregating duplicate transmission control protocol (TCP) packets of a data stream that has been duplicated and sent over disjoint routing paths, wherein each duplicate pair of packets comprises a packet sequence number, within the data stream, unique to that duplicate pair, the method comprising iteratively:

generating a window of packet sequence numbers for the data stream starting with a lowest packet sequence number, of the data stream, that has not been received, by creating a list of TCP packet fragments, each fragment being defined by a packet sequence number and a memory location storing a payload fragment;

receiving a TCP packet sent over one of a first routing path and a second, disjoint routing path;

if the packet sequence number of the received TCP packet is outside the window or is a duplicate of a previously received TCP packet, dropping the received TCP packet;

if the packet sequence number of the received TCP packet is within the window and is not a duplicate of a previously received TCP packet, storing the received TCP packet.

2. The method of claim 1, wherein a size of the window corresponds to an advertised TCP receive window size for the data stream.

3. The method of claim 1 further comprising measuring a latency difference between the first and second routing paths.

4. The method of claim 3, wherein measuring the latency difference between the first and second routing paths comprises determining a difference between an arrival time of a TCP packet and a corresponding duplicate of the TCP packet.

5. The method of claim 3, wherein measuring the latency difference between the first and second routing paths comprises determining a difference between an arrival time of each of a plurality of TCP packets and corresponding duplicates of the TCP packets.

6. The method of claim 1 further comprising determining whether the TCP packet sequence number of the received TCP packet corresponds to the lowest packet sequence number, of the data stream, that has not been received.

7. The method of claim 6 further comprising, if the TCP packet sequence number of the received TCP packet corresponds to the lowest packet sequence number, of the data stream, that has not been received, identifying an updated value of the lowest packet sequence number, of the data stream, that has not been received, based at least on the packet sequence number of the received TCP.

8. The method of claim 7, wherein the updated value of the lowest packet sequence number, of the data stream, that has not been received, is further based on one or more packet sequence numbers of previously received TCP packets.

9. The method of claim 1, wherein storing the received TCP packet comprises storing the packet within a data storage of received TCP packets.

10. The method of claim 9, wherein the stored TCP packets are stored in an order defined by the packet sequence numbers of the TCP packets.

11. A non-transitory machine readable medium storing a program for aggregating duplicate transmission control protocol (TCP) packets of a data stream that has been duplicated and sent over disjoint routing paths, wherein each duplicate pair of packets comprises a packet sequence number, within the data stream, unique to that duplicate pair, the program comprising sets of instructions for iteratively:

generating a window of packet sequence numbers for the data stream starting with a lowest packet sequence number, of the data stream, that has not been received, by creating a list of TCP packet fragments, each fragment being defined by a packet sequence number and a memory location storing a payload fragment;

receiving a TCP packet sent over one of a first routing path and a second, disjoint routing path;

when the packet sequence number of the received TCP packet is outside the window or is a duplicate of a previously received TCP packet, dropping the received TCP packet;

when the packet sequence number of the received TCP packet is within the window and is not a duplicate of a previously received TCP packet, storing the received TCP packet.

12. The non-transitory machine readable medium of claim 11, wherein a size of the window corresponds to an advertised TCP receive window size for the data stream.

13. The non-transitory machine readable medium of claim 11, wherein the program further comprises a set of instructions for measuring a latency difference between the first and second routing paths.

14. The non-transitory machine readable medium of claim 13, wherein the set of instructions for measuring the latency difference between the first and second routing paths comprises a set of instructions for determining a difference between an arrival time of a TCP packet and a corresponding duplicate of the TCP packet.

15. The non-transitory machine readable medium of claim 13, wherein the set of instructions for measuring the latency difference between the first and second routing paths comprises a set of instructions for determining a difference between an arrival time of each of a plurality of TCP packets and corresponding duplicates of the TCP packets.

16. The non-transitory machine readable medium of claim 11, wherein the program further comprises a set of instructions for determining whether the TCP packet sequence number of the received TCP packet corresponds to the lowest packet sequence number, of the data stream, that has not been received.

17. The non-transitory machine readable medium of claim 16, wherein the program further comprises a set of instructions for identifying, when the TCP packet sequence number of the received TCP packet corresponds to the lowest packet sequence number, of the data stream, that has not been received, an updated value of the lowest packet sequence number, of the data stream, that has not been received, based at least on the packet sequence number of the received TCP.

18. The non-transitory machine readable medium of claim 17, wherein the updated value of the lowest packet sequence number, of the data stream, that has not been received, is further based on one or more packet sequence numbers of previously received TCP packets.

19. The non-transitory machine readable medium of claim 11, wherein the set of instructions for storing the received TCP packet comprises a set of instructions for storing the packet within a data storage of received TCP packets.

20. The non-transitory machine readable medium of claim 19, wherein the stored TCP packets are stored in an order defined by the packet sequence numbers of the TCP packets.

\* \* \* \* \*